(12) United States Patent
Jiang et al.

(10) Patent No.: US 11,489,646 B2
(45) Date of Patent: *Nov. 1, 2022

(54) FOUNTAIN HARQ FOR RELIABLE LOW LATENCY COMMUNICATION

(71) Applicant: Qualcomm Incorporated, San Diego, CA (US)

(72) Inventors: Jing Jiang, San Diego, CA (US); Joseph Binamira Soriaga, San Diego, CA (US); Tingfang Ji, San Diego, CA (US); Kambiz Azarian Yazdi, San Diego, CA (US); Krishna Kiran Mukkavilli, San Diego, CA (US); John Edward Smee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,876

(22) Filed: Jun. 28, 2019

(65) Prior Publication Data

US 2019/0327062 A1  Oct. 24, 2019

Related U.S. Application Data

(63) Continuation of application No. 14/681,896, filed on Apr. 8, 2015, now Pat. No. 10,367,621.

(Continued)

(51) Int. Cl.
*H04L 5/00* (2006.01)
*H04W 72/04* (2009.01)
(Continued)

(52) U.S. Cl.
CPC .......... *H04L 5/0055* (2013.01); *H04L 1/0003* (2013.01); *H04L 1/0009* (2013.01);
(Continued)

(58) Field of Classification Search
CPC .................................................... H04L 5/0055
See application file for complete search history.

(56) References Cited

U.S. PATENT DOCUMENTS 6,718,179 B1   4/2004  Forssell et al.
8,098,601 B2   1/2012  Cai et al.
(Continued)

FOREIGN PATENT DOCUMENTS

CN        1864361 A       11/2006
CN      102055576 A        5/2011
(Continued)

OTHER PUBLICATIONS

IPWIRELESS: "Operation of the OFDMA DL and SC-FDMA / OFDMA UL in Unpaired Spectrum According to Coexistence Approach 2", 3GPP TSG RAN WG1#43, Tdoc R1-051537, Nov. 2005, 14 Pages Internet URL: http://www.3gpp.org/ftp/tsg ran/ WG1_RL1/TSGR1_43/Docs/R1-051537.zip.
(Continued)

*Primary Examiner* — Zhiren Qin
(74) *Attorney, Agent, or Firm* — Terry Tsai

(57) ABSTRACT

Methods, systems, and devices are described for fountain hybrid automatic repeat request (HARD) for reliable low latency communication. A wireless device may transmit a data block based on a low latency operational mode. The device may then transmit a number of redundancy versions of the data block prior to determining whether an acknowledgement (ACK) has been received. In some examples the ACK may be an augmented ACK, which may be based on the number of redundancy versions received prior to successfully decoding the data block, and which may include an additional resource request. In some examples, the device may select an updated modulation and coding scheme (MCS) based on the augmented ACK. In some examples, the device may increase a number of frequency resources (e.g.,
(Continued)

component carriers) used for transmission based on the augmented ACK.

26 Claims, 16 Drawing Sheets

Related U.S. Application Data

(60) Provisional application No. 62/069,133, filed on Oct. 27, 2014.

(51) Int. Cl.
| | | |
|---|---|---|
| H04L 1/18 | (2006.01) | |
| H04L 1/00 | (2006.01) | |
| H04L 1/16 | (2006.01) | |
| H04L 5/14 | (2006.01) | |

(52) U.S. Cl.
CPC .......... *H04L 1/0023* (2013.01); *H04L 1/0047* (2013.01); *H04L 1/1671* (2013.01); *H04L 1/189* (2013.01); *H04L 1/1812* (2013.01); *H04L 1/1819* (2013.01); *H04L 1/1845* (2013.01); *H04L 1/1887* (2013.01); *H04L 5/1469* (2013.01); *H04W 72/0413* (2013.01); *H04L 1/1614* (2013.01); *H04L 5/001* (2013.01); *H04L 5/14* (2013.01)

(56) References Cited

U.S. PATENT DOCUMENTS

| | | | |
|---|---|---|---|
| 8,392,808 B2 | 3/2013 | Spencer et al. | |
| 8,819,514 B2 | 8/2014 | Terry et al. | |
| 8,855,069 B2 | 10/2014 | Lohr et al. | |
| 2003/0063587 A1* | 4/2003 | Cho | H04L 1/0034 370/335 |
| 2003/0079170 A1 | 4/2003 | Stewart et al. | |
| 2008/0065944 A1 | 3/2008 | Seol et al. | |
| 2008/0101246 A1 | 5/2008 | Jiang | |
| 2009/0175369 A1* | 7/2009 | Atarashi | H04L 1/1893 370/344 |
| 2009/0257408 A1 | 10/2009 | Zhang et al. | |
| 2010/0016023 A1* | 1/2010 | Yamauchi | H04L 5/0078 455/562.1 |
| 2010/0054137 A1 | 3/2010 | Deng et al. | |
| 2010/0067460 A1 | 3/2010 | Hu et al. | |
| 2010/0080176 A1* | 4/2010 | Maas | H04L 1/0034 370/329 |
| 2011/0014907 A1 | 1/2011 | Ringstroem et al. | |
| 2011/0096701 A1 | 4/2011 | Lin | |
| 2012/0047408 A1* | 2/2012 | Wilborn | H04L 1/1845 714/718 |
| 2012/0218882 A1 | 8/2012 | Ko et al. | |
| 2013/0176864 A1* | 7/2013 | Quan | H04L 1/0002 370/252 |
| 2013/0242889 A1 | 9/2013 | Khoryaev et al. | |
| 2013/0343273 A1* | 12/2013 | Barbieri | H04L 1/1887 370/328 |
| 2014/0105141 A1* | 4/2014 | Noh | H04L 5/0058 370/329 |
| 2014/0226607 A1* | 8/2014 | Holma | H04L 1/1812 370/329 |
| 2014/0245095 A1 | 8/2014 | Nammi et al. | |
| 2015/0071267 A1* | 3/2015 | Wu | H04W 52/50 370/336 |
| 2015/0229444 A1* | 8/2015 | Webb | H04L 1/1812 370/329 |
| 2015/0245326 A1* | 8/2015 | Rune | H04W 72/042 370/329 |
| 2016/0050658 A1* | 2/2016 | Tabet | H04L 5/0092 370/329 |
| 2016/0112181 A1* | 4/2016 | Tabet | H04W 72/042 370/296 |
| 2016/0119105 A1 | 4/2016 | Jiang et al. | |
| 2016/0183286 A1 | 6/2016 | Park et al. | |
| 2016/0241615 A1* | 8/2016 | Chen | H04L 65/607 |
| 2016/0269153 A1 | 9/2016 | Zhang et al. | |

FOREIGN PATENT DOCUMENTS

| | | |
|---|---|---|
| EP | 1401139 A1 | 3/2004 |
| EP | 1973255 A1 | 9/2008 |
| EP | 2723010 A1 | 4/2014 |
| JP | 62239735 A | 10/1987 |
| JP | 2003018131 A | 1/2003 |
| JP | 2004519904 A | 7/2004 |
| JP | 2008072720 A | 3/2008 |
| JP | 2008118648 A | 5/2008 |
| JP | 2009260969 A | 11/2009 |
| JP | 2013536633 A | 9/2013 |
| KR | 20080039305 A | 5/2008 |
| WO | WO-2010029764 A1 | 3/2010 |
| WO | WO2013098594 A1 | 7/2013 |
| WO | WO-2014161820 A1 | 10/2014 |

OTHER PUBLICATIONS

European Search Report—EP18186472—Search Authority—The Hague—Oct. 17, 2018.
I C-L, "Defining the Wireless Future—Vision 2020: Perspectives of Mobile Operators (5G: Data Rate and More)," Keynote ICC2014, Jun. 13, 2014 (Jun. 13, 2014), pp. 1-33, XP055227730, Retrieved from the Internet: URL:http://icc2014.IEEE-icc.org/speakers_28_2327600902.pdf.
International Search Report and Written Opinion—PCT/US2015/052559—ISA/EPO—Dec. 21, 2015.
Second Written Opinion from International Application No. PCT/US2015/052559, dated Oct. 6, 2016, 11 pages.
Taiwan Search Report—TW104132226—TIPO—Jan. 8, 2019.

\* cited by examiner

FOUNTAIN HARQ FOR RELIABLE LOW LATENCY COMMUNICATION

CROSS REFERENCES

The present Application for Patent is a Continuation of U.S. patent application Ser. No. 14/681,896 by Jiang, et al., entitled, "Fountain HARQ For Reliable Low Latency Communication" filed Apr. 8, 2015, which claims priority to U.S. Provisional Patent Application No. 62/069,133 by Jiang et al., entitled "Fountain HARQ For Reliable Low Latency Communication," filed Oct. 27, 2014, assigned to the assignee hereof, and expressly incorporated by reference herein.

BACKGROUND

Field of Disclosure

The following relates generally to wireless communication, and more specifically to fountain hybrid automatic repeat request (HARQ) for reliable low latency communication.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station). In some cases, UEs may also communicate directly with each other.

In some cases, a wireless device may send HARQ feedback such as an acknowledgement (ACK) or a negative acknowledgment (NACK) to indicate whether a transmission was correctly received. If the transmitter of the message receives a NACK, it may retransmit the message to ensure successful delivery of the data. However, the HARQ process may take a significant amount of time based on the decoding time and the round trip time for the NACK and retransmission. This may contribute to latency in communication between devices, which may interfere with the data rate and reliability of the wireless link.

SUMMARY

The present disclosure may relate generally to wireless communications systems, and more particularly to improved systems, methods, or apparatuses associated with fountain hybrid automatic repeat request (HARQ) for reliable low latency communication. A wireless device may transmit a data block based on a low latency operational mode. The device may then transmit a number of redundancy versions of the data block prior to determining whether an acknowledgement (ACK) has been received. In some examples the ACK may be an augmented ACK, which may be based on the number of redundancy versions received prior to successfully decoding the data block, and which may include an additional resource request. In some examples, the device may select an updated modulation and coding scheme (MCS) based on the augmented ACK. In some examples, the device may increase a number of frequency resources (e.g., component carriers) used for transmission based on the augmented ACK.

A method of wireless communication is described. The method may include transmitting a data block using a first set of resources based on a low latency operational mode, and transmitting a number of redundancy versions of the data block using a second set of resources based on the low latency operational mode, the number of redundancy versions of the data block being transmitted prior to determining whether an ACK is received for the data block.

An apparatus for wireless communication is described. The apparatus may include means for transmitting a data block using a first set of resources based on a low latency operational mode, and means for transmitting a number of redundancy versions of the data block using a second set of resources based on the low latency operational mode, the number of redundancy versions of the data block being transmitted prior to determining whether an ACK is received for the data block.

A further apparatus for wireless communication is described. The apparatus may include a processor, memory in electronic communication with the processor, and instructions stored in the memory, wherein the instructions are executable by the processor to transmit a data block using a first set of resources based on a low latency operational mode, and transmit a number of redundancy versions of the data block using a second set of resources based on the low latency operational mode, the number of redundancy versions of the data block being transmitted prior to determining whether an ACK is received for the data block.

A non-transitory computer-readable medium storing code for wireless communication is described. The code may include instructions executable to transmit a data block using a first set of resources based on a low latency operational mode, and transmit a number of redundancy versions of the data block using a second set of resources based on the low latency operational mode, the number of redundancy versions of the data block being transmitted prior to determining whether an ACK is received for the data block.

Some examples of the method, apparatuses, or non-transitory computer-readable medium described above may further include selecting an initial MCS based at least in part on a channel condition or a size of the data block, wherein transmitting the data block is based on the initial MCS. Additionally or alternatively, in some examples the ACK is an augmented ACK based at least in part on the number of redundancy versions and comprising an additional resource request, and selecting an updated MCS based at least in part on the augmented ACK.

Some examples of the method, apparatuses, or non-transitory computer-readable medium described above may further include receiving the ACK on a reduced symbol duration uplink (UL) control channel based on the low latency operational mode. Additionally or alternatively, some examples may include receiving a number of NACKs corresponding to the number of redundancy versions on the reduced symbol duration UL control channel.

Some examples of the method, apparatuses, or non-transitory computer-readable medium described above may further include refraining from transmitting an additional redundancy version of the data block based on the ACK. Additionally or alternatively, in some examples the low latency operational mode comprises a reduced transmission time interval (TTI) time period.

In some examples of the method, apparatuses, or non-transitory computer-readable medium described above, the second set of resources is contiguous to the first set of resources in time. Additionally or alternatively, some examples may include transmitting control information on a reduced symbol duration downlink (DL) control channel based on the low latency operational mode.

A method of wireless communication is described. The method may include receiving a data block using a first set of resources based on a low latency operational mode, computing a first set of LLRs for the data block, determining that a first set of decoded bits from the first set of LLRs does not pass a CRC, receiving a number of redundancy versions of the data block based on the low latency operational mode using a second set of resources prior to transmitting a NACK, computing an updated set of LLRs for the data block based on the number of redundancy versions, determining that a second set of decoded bits from the updated set of LLRs passes the CRC, and transmitting an ACK for the data block based on the determination that the updated set of LLRs passes the CRC.

An apparatus for wireless communication is described. The apparatus may include means for receiving a data block using a first set of resources based on a low latency operational mode, means for computing a first set of LLRs for the data block, means for determining that a first set of decoded bits from the first set of LLRs does not pass a CRC, means for receiving a number of redundancy versions of the data block based on the low latency operational mode using a second set of resources prior to transmitting a NACK, means for computing an updated set of LLRs for the data block based on the number of redundancy versions, means for determining that a second set of decoded bits from the updated set of LLRs passes the CRC, and means for transmitting an ACK for the data block based on the determination that the updated set of LLRs passes the CRC.

A further apparatus for wireless communication is described. The apparatus may include a processor, memory in electronic communication with the processor, and instructions stored in the memory, wherein the instructions are executable by the processor to receive a data block using a first set of resources based on a low latency operational mode, compute a first set of LLRs for the data block, determine that a first set of decoded bits from the first set of LLRs does not pass a CRC, receive a number of redundancy versions of the data block based on the low latency operational mode using a second set of resources prior to transmitting a NACK, compute an updated set of LLRs for the data block based on the number of redundancy versions, determine that a second set of decoded bits from the updated set of LLRs passes the CRC, and transmit an ACK for the data block based on the determination that the updated set of LLRs passes the CRC.

A non-transitory computer-readable medium storing code for wireless communication is described. The code may include instructions executable to receive a data block using a first set of resources based on a low latency operational mode, compute a first set of LLRs for the data block, determine that a first set of decoded bits from the first set of LLRs does not pass a CRC, receive a number of redundancy versions of the data block based on the low latency operational mode using a second set of resources prior to transmitting a NACK, compute an updated set of LLRs for the data block based on the number of redundancy versions, determine that a second set of decoded bits from the updated set of LLRs passes the CRC, and transmit an ACK for the data block based on the determination that the updated set of LLRs passes the CRC.

In some examples of the method, apparatuses, or non-transitory computer-readable medium described above, receiving the data block comprises receiving the data block using an initial MCS based at least in part on a channel condition or a size of the data block. Additionally or alternatively, in some examples the ACK is an augmented ACK based at least in part on the number of redundancy versions and comprising an additional resource request.

Some examples of the method, apparatuses, or non-transitory computer-readable medium described above may further include receiving a subsequent data block using an updated MCS based at least in part on the augmented ACK. Additionally or alternatively, in some examples the additional resource request is based at least in part on one or more reliability metrics.

In some examples of the method, apparatuses, or non-transitory computer-readable medium described above, the ACK is transmitted on a reduced symbol duration UL control channel based on the low latency operational mode. Additionally or alternatively, some examples may include transmitting a number of NACKs corresponding to the number of redundancy versions on the reduced symbol duration UL control channel.

Some examples of the method, apparatuses, or non-transitory computer-readable medium described above may further include receiving control information on a reduced symbol duration DL control channel based on the low latency operational mode. Additionally or alternatively, in some examples the low latency operational mode comprises a reduced TTI time period.

In some examples of the method, apparatuses, or non-transitory computer-readable medium described above, the second set of resources is contiguous to the first set of resources in time. Additionally or alternatively, in some examples receiving the number of redundancy versions of the data block comprises receiving the number of redundancy versions of the data block over a plurality of symbols.

Some examples of the method, apparatuses, or non-transitory computer-readable medium described above may further include determining that an accumulated quality metric for the updated set of LLRs exceeds a threshold. Additionally or alternatively, some examples may include performing a decoding operation based on the updated set of LLRs and the determination that the accumulated quality metric exceeds the threshold, wherein the second set of decoded bits is an output of the decoding operation.

In some examples of the method, apparatuses, or non-transitory computer-readable medium described above, the decoding operation is based in part on an intermediate set of LLRs or an intermediate set of decoded bits.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, or apparatuses associated with fountain HARQ for reliable low latency communication. Some wireless systems (e.g., most 3GPP/3GPP2 standards) may employ an interlaced hybrid automatic repeat request (HARQ) structure. Such a structure may avoid stalling (i.e., due to decoding/acknowledgement latency) by efficiently multiplexing multiple packets. However, in a delay sensitive communication with small payload size, interlaced HARQ may introduce a significant delay and may significantly decrease the link-budget. Thus, a wireless communication system may use a fountain HARQ to mitigate the resulting latency.

In a fountain HARQ scheme, a transmitter may select a rate/modulation scheme as well as a targeted latency based on channel conditions, payload size, etc. The transmitter may continue to send the data (e.g., redundancy versions) in back-to-back transmit time intervals (TTIs) until an ACK is received. The receiver may accumulate the multiple received data symbols, compute log-likelihood (LLRs), and send an ACK to stop transmission whenever the computed LLRs pass a cyclic redundancy check (CRC). As a result, there may be no use of NACK signals.

In some instances, the receiver may convey additional feedback requests on the ACK (i.e., an augmented ACK). The feedback may include update requests for bandwidth (BW), additional carriers, coordinated multi-point transmission/reception (COMP), an updated precoding matrix indicator (PMI), or an updated rank indicator (RI). In other words, the augmented ACK may be used to request additional resources, additional coordination, or adjustment to the transmission scheme. In some instances, channel quality information may be derived using information such as a channel estimate, demodulation LLR values, or decoder LLR values. Thus, in some examples, the ACK may be based on channel estimate quality, demodulation LLR quality, and decoder LLR quality. In some cases, a thin control channel (e.g., a control channel with a reduced symbol duration) may be used to improve feedback and control efficiency (e.g., overhead due to decoding/HARQ retransmission time).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
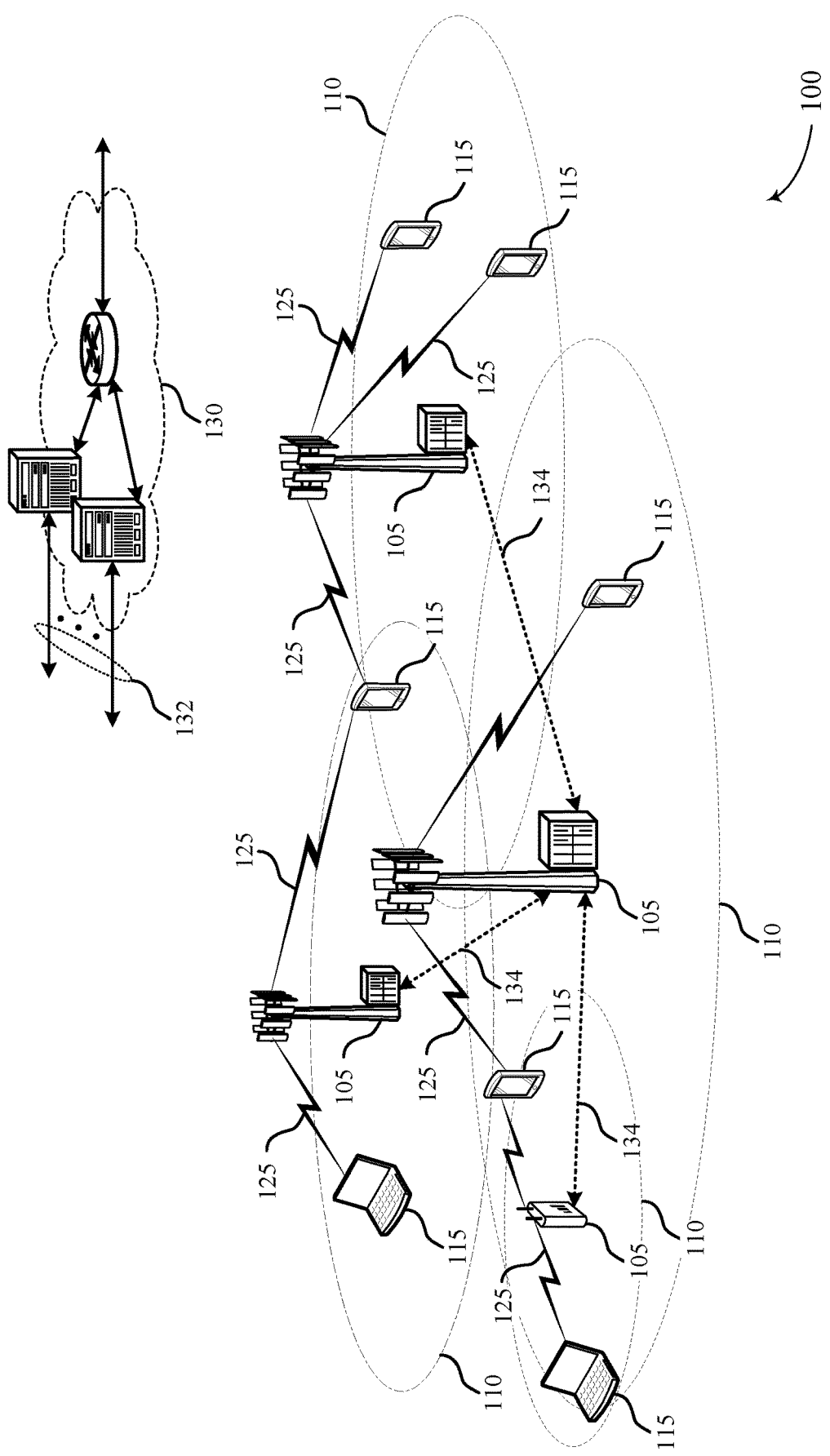
FIG. 1 illustrates an example of a wireless communications system for fountain hybrid automatic repeat request (HARQ) for reliable low latency communication in accordance with various aspects of the present disclosure.

FIG. 1 illustrates an example of a wireless communications system 100 in accordance with various aspects of the present disclosure. The wireless communications system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Wireless communication links 125 may also be established between UEs 115 in a configuration known as device-to-device (D2D) communications. One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

In some embodiments of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

HARQ may be a method of ensuring that data is received correctly over a wireless communication link 125. HARQ may include a combination of error detection (e.g., using a cyclic redundancy check (CRC)), forward error correction (FEC), and retransmission (i.e., automatic repeat request (ARQ)). HARQ may improve throughput at the MAC layer in poor radio conditions (e.g., poor signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative acknowledgement (NACK) indicating a failed attempt to decode the information.

According to the present disclosure, a wireless device such as a UE 115 or a base station 105 may transmit a data block based on a low latency operational mode. The device may then transmit a number of redundancy versions of the data block prior to determining whether an ACK has been received. In some examples the ACK may be an augmented ACK, which may be based on the number of redundancy versions received prior to successfully decoding the data block, and which may include an additional resource request. In some examples, the device may select an updated modulation and coding scheme (MCS) based on the augmented ACK. In some examples, the device may increase a number of frequency resources (e.g., component carriers) used for transmission based on the augmented ACK.

Figure 2:
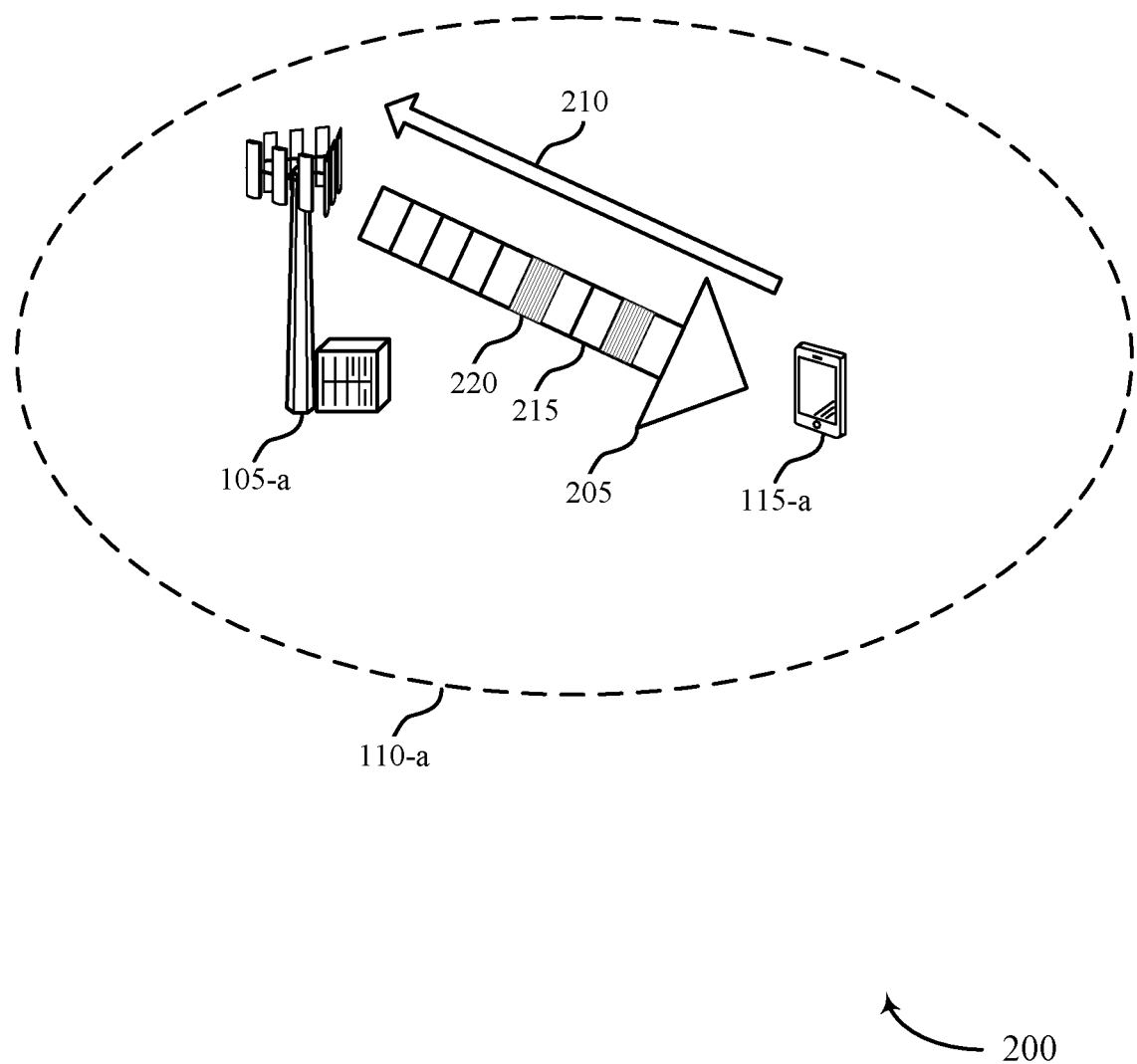
FIG. 2 illustrates an example of a wireless communications subsystem associated with fountain HARQ for reliable low latency communication in accordance with various aspects of the present disclosure.

FIG. 2 illustrates an example of a wireless communications subsystem 200 associated with fountain HARQ for reliable low latency communication in accordance with various aspects of the present disclosure. Wireless communications subsystem 200 may include UE 115-a, which may be an example of a UE 115 described above with reference to FIG. 1. Wireless communications subsystem 200 may also include a base station 105-a, which may be an example of a base station 105 described above with reference to FIG. 1. Base station 105-a may communicate with any UE 115 within its coverage area 110-a via downlink 205 and uplink 210, as generally described above with respect to FIG. 1.

For example, base station 105-a may transmit data to UE 115-a on downlink 205, and UE 115-a may send HARQ acknowledgments and negative-acknowledgments (ACK/NACKs) on uplink 210 informing base station 105-a of the reception status of the data. According to the present disclosure, base station 105-a may continuously transmit redundancy versions of a data block to UE 115-a until base station 105-a receives an ACK from UE 115-a (i.e., base station 105 may implement a fountain HARQ procedure). In some examples, UE 115-a may implement fountain HARQ on uplink 210, or in D2D communications with another UE 115 (not shown).

In a first HARQ scheme, base station 105-a may use a first transmit time interval (TTI) to send a data block to UE 115-a. Base station 105-a may then wait for an ACK/NACK response from UE 115-a. Upon reception of a NACK, base station 105-a may transmit a redundancy version (e.g., the same data encoded differently) to UE 115-a. In the event UE 115-a correctly receives the data block, UE 115-a may transmit (and base station 105-a may receive) an ACK indicating to base station 105-a that additional redundancy versions are not requested. In some examples the ACK/NACKs may be interlaced (e.g., multiple packets are multiplexed) to reduce stall due to decoding/ACK latency. However, the round trip time for a NACK and the following retransmission may introduce significant latency for delay-sensitive communications. Thus, wireless communications subsystem 200 may use a second HARQ scheme such as a fountain HARQ scheme.

The second HARQ scheme may be associated with bursts based on a reduced TTI. For example, base station 105-a may transmit a data block to UE 115-a during a short TTI burst 220. In some cases, short TTI burst 220 may include a number of contiguous TTIs which may be embedded within and have a shorter length than default TTIs 215. After the initial transmission of the data block in short TTI burst 220, base station 105-a may transmit redundancy versions of the data in subsequent short TTIs within short TTI burst 220 until base station 105-a receives an ACK from UE 115-a over uplink 210.

Accordingly, UE 115-a may accumulate the received data blocks and send an ACK after a successful cyclic redundancy check (CRC). In some cases, UE 115-a may send an augmented ACK which conveys additional feedback for base station 105-a. For example, the augmented ACK may request adjustment of the transmission scheme, additional bandwidth (e.g., carriers), resources, and coordination. Upon reception of the augmented ACK, base station 105-a may adjust communication parameters based on the augmented ACK feedback and cease transmission of the data redundancy versions.

Although described in conjunction with the fountain HARQ scheme, bursts of short TTIs may be used for any HARQ scheme, including the first HARQ scheme described above. Furthermore, a communication link may include any number of short TTI bursts, which may be variable in length, and may include any number of short TTIs, which also may be variable in length. Different TTI lengths may also be used for different component carriers. For example, one or more component carriers may utilize short TTIs while other component carriers may utilize longer default TTIs 215.

Thus, UE 115-a or a base station 105-a may transmit a data block based on a low latency (e.g., short TTI) operational mode. The transmitting device may then send a number of redundancy versions of the data block prior to determining whether an ACK has been received. In some examples the ACK may be an augmented ACK, which may be based on the number of redundancy versions received prior to successfully decoding the data block, and which may include an additional resource request. In some examples, the transmitting device may select an updated modulation and coding scheme (MCS) or increase a number of frequency resources (e.g., component carriers) used for transmission based on the augmented ACK.

Figure 3:
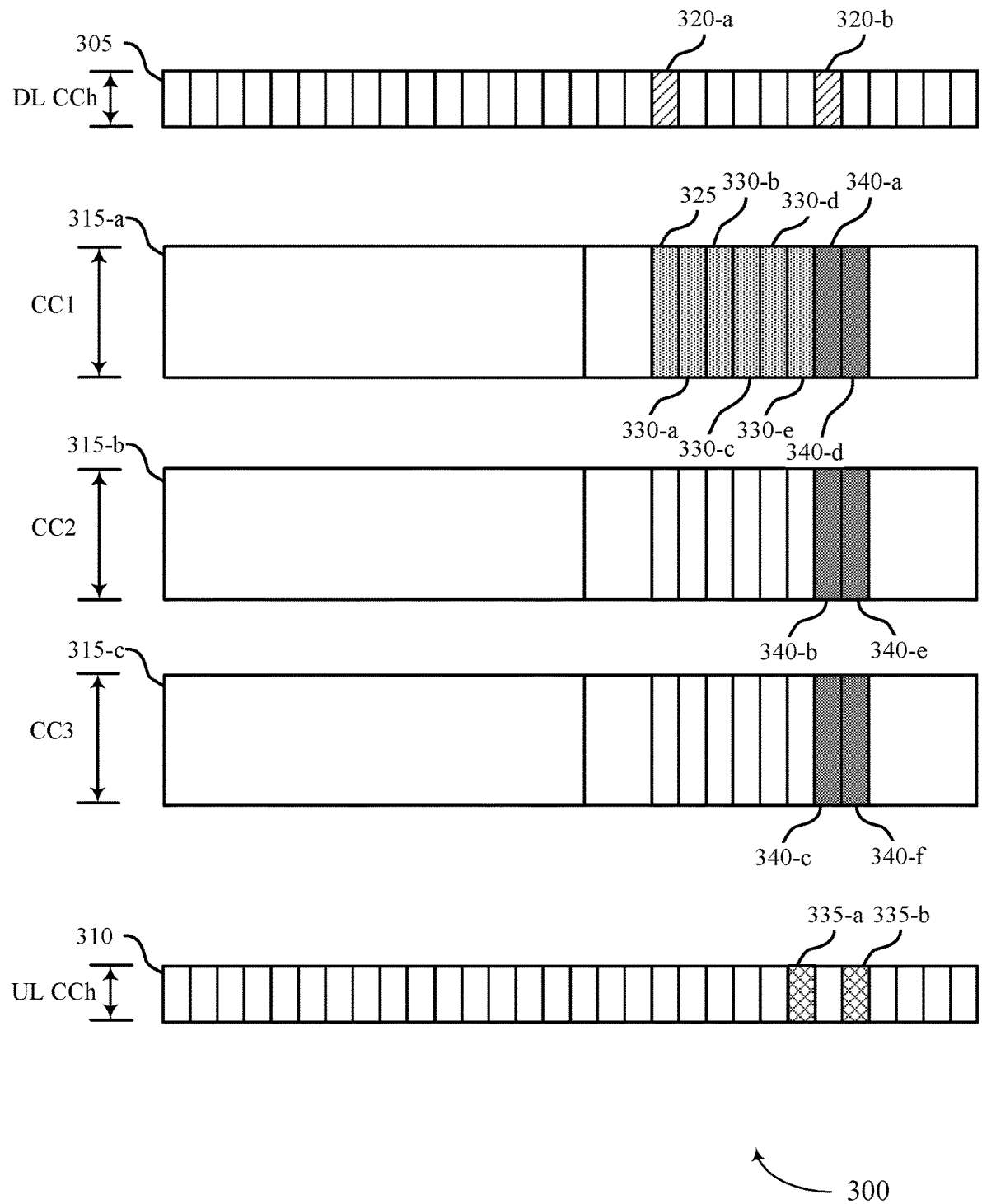
FIG. 3 illustrates an example of a fountain HARQ timeline associated with reliable low latency communication in accordance with various aspects of the present disclosure.

FIG. 3 illustrates an example of a fountain HARQ timeline 300 associated with reliable low latency communication in accordance with various aspects of the present disclosure. Fountain HARQ timeline 300 may be used for data transmission between a UE 115 and a base station 105, such as those described above with reference to FIGS. 1-2. Fountain HARQ timeline 300 includes a downlink control channel 305 and an uplink control channel 310, which may be aspects of downlink 205 and uplink 210 such as described above with reference to FIG. 2. The fountain HARQ design illustrated by fountain HARQ timeline 300 may also be applied to UL data transmissions and to D2D communications.

Additionally, fountain HARQ timeline 300 depicts component carrier 315-a, component carrier 315-b, and component carrier 315-c. In some cases, the number of redundancy versions in a fountain HARQ scheme may introduce overhead. Thus, a control channel (e.g., downlink control channel 305 and/or uplink control channel 310) may be configured to include a reduced symbol period (i.e., the control channel may be a thin control channel) to mitigate the impact of the additional HARQ overhead.

A base station 105 may convey a downlink grant 320-a to a UE 115 via downlink control channel 305. In the same or subsequent TTI, the base station 105 may transmit data block 325 on component carrier 315-a. In some instances the TTI may be part of a burst of short TTIs, such as described with reference to FIG. 2. To improve reception of data block 325, base station 105 may transmit redundancy versions of the data block 325 until the UE 115 responds with an ACK. In one example the base station 105 may transmit redundancy versions 330-(a through e) of data block 325. For each redundancy version of data block 325, the UE 115 may compute log-likelihood ratios (LLRs) to estimate the transmitted bits. The UE 115 may use the updated decoded bits to perform redundancy cyclic checks (CRC) until one passes. After a successful CRC, the UE 115 may transmit an ACK 335-a on uplink control channel 310 to the base station 105. In some cases, based on the timing of ACK 335-a, the base station 105 may transmit one more redundancy version 330-e before terminating transmission of redundancy versions 330. That is, the base station 105 may transmit redundancy version 330-e at the same time as ACK 335-a. Although described with references to a base station 105 and a UE 115, fountain HARQ timeline 300 may be an example of a HARQ timeline for UL data transmissions or between two UEs 115.

In some instances, ACK 335-a may be an augmented ACK. An augmented ACK may be based on the number of redundancy versions 330 which have been received at the UE 115 prior to successfully decoding a data block. In some cases, augmented ACK 335-a may convey feedback information or an additional resource request from the UE 115 to the base station 105. For example, augmented ACK 335-a may request additional bandwidth (e.g., carriers). Thus, the base station 105 may receive augmented ACK 335-a and make adjustments to the transmission scheme based on the information. For instance, upon transmission of downlink grant 320-a, the base station 105 may allocate component carrier 315-a, component carrier 315-b, and component carrier 315-c for UE 115. Consequently, a downlink data transmission may include data block version 340-a on component carrier 315-a, data block version 340-b on component carrier 315-b, and data block version 340-c on component carrier 315-c. The UE 115 may receive data block versions 340 (a through c) and perform a successful CRC, thus triggering the transmission of ACK 335-b. In some cases ACK 335-b may also be an augmented ACK. Based on the reception time of ACK 335-b, base station 105 may cease transmission of redundancy versions. In some cases, an additional set of redundancy versions 340-(d through f) of data block versions 340 (a through c) may be transmitted concurrently with ACK 335-b.

In some cases, the base station 105 may select an initial modulation and coding scheme (MCS) for downlink transmissions. The MCS may be based in part on a channel condition or the size of the data to be transmitted. In some examples, the transmission of the data block 325 may be based on the initial MCS. In the cases in which an augmented ACK 335-a has been received at the base station 105, the base station may update the MCS for transmission of data block 340.

Figure 4:
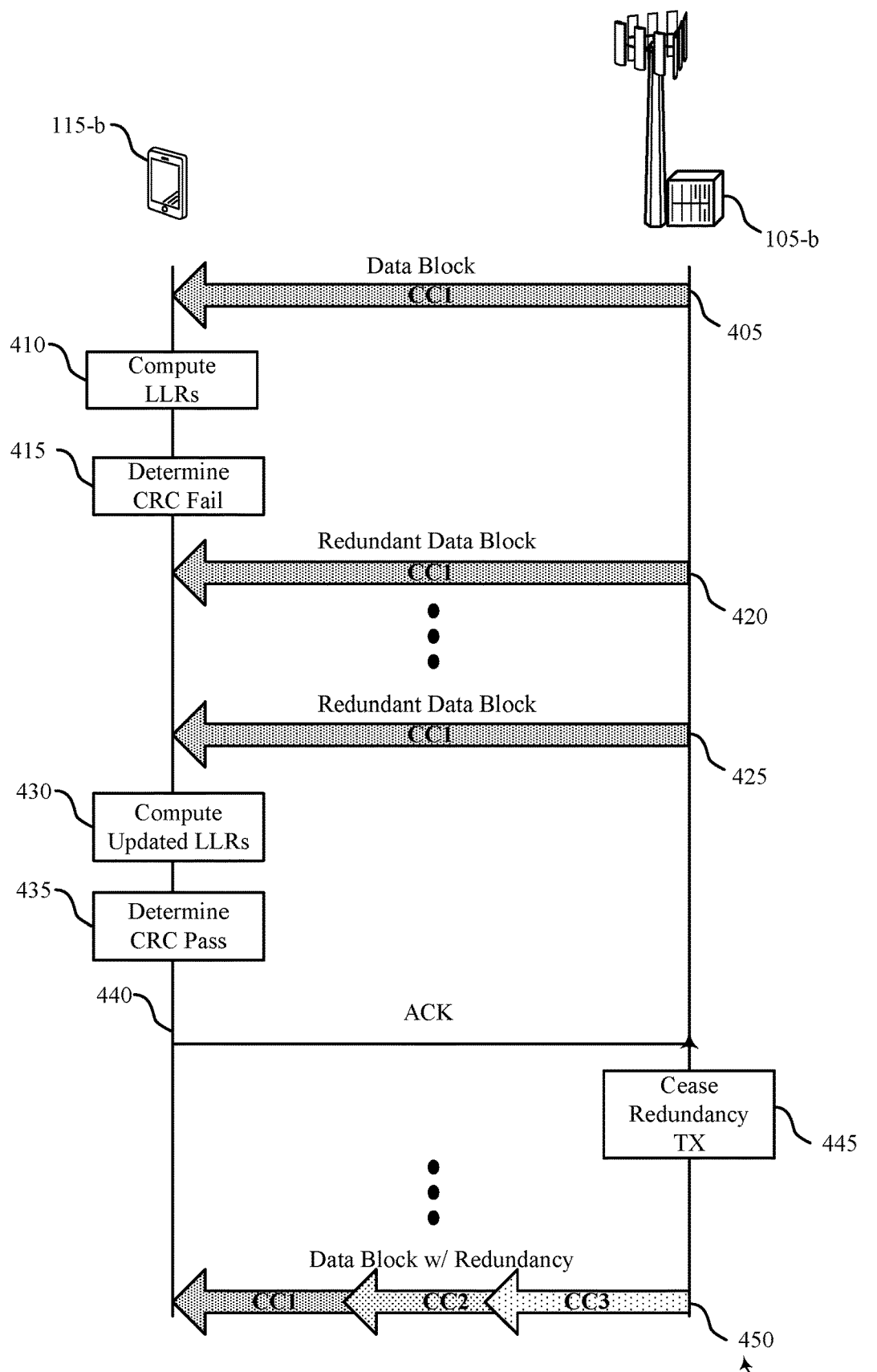
FIG. 4 illustrates an example of a process flow associated with fountain HARQ for reliable low latency communication in accordance with various aspects of the present disclosure.

FIG. 4 illustrates an example of a process flow 400 associated with fountain HARQ for reliable low latency communication in accordance with various aspects of the present disclosure. Process flow diagram 400 may include UE 115-b, which may be an example of a UE 115 described above with reference to FIGS. 1-2. Process flow diagram 400 may also include a base station 105-b, which may be an example of a base station 105 described above with reference to FIGS. 1-2. Process flow diagram 400 may utilize a data transmission scheme between a UE 115 and a base station 105, as described above with reference to FIG. 3. The fountain HARQ process illustrated by process flow 400 may also be applied to UL data transmissions and to D2D communications.

At step 405, base station 105-b may transmit (and UE 115-b may receive) a data block using a first set of resources based on a low latency operation mode. For example, base station 105-b may transmit a data block using a first set of resources based on a low latency operational mode. Base station 105-b may also select an initial modulation and coding scheme (MCS) based at least in part on a channel condition or a size of the data block At step 410 UE 115-b may calculate a set of LLRs for the data block. At step 415, UE 115-b may determine that the LLRs do not pass CRC check (i.e., UE 115-b may have only received a portion of the data block, or the data block may have experienced corruption).

Subsequently, at step 420 and step 425, base station 105-*b* may transmit and UE 115-*b* may receive a number of redundancy versions of the data block using a second set of resources based on the low latency operational mode prior to base station 105-*b* determining whether an ACK is received for the data block. In some examples, the second set of resources may be contiguous to (i.e., immediately following) the first set of resources in time. In some cases, UE 115-*b* may transmit a number of NACKs corresponding to the number of redundancy versions.

At step 430, UE 115-*b* may compute an updated set of LLRs for the data block based on the number of redundancy versions. At step 435, UE 115-*b* may determine that the updated set of LLRs passes a CRC check.

Subsequently, at step 440, UE 115-*b* may transmit an ACK for the data block based on the determination that the updates set of LLRs passed the CRC check. In some examples the ACK is an augmented ACK based at least in part on the number of redundancy versions and comprising an additional resource request. In some examples, the ACK may be transmitted on a reduced symbol duration (and/or TTI duration) UL control channel.

Upon reception of the ACK from UE 115-*b*, base station 105-*b* may cease transmission of the redundancy version of the data block at step 445. Base station 105-*b* may also select an updated MCS based on receiving an augmented ACK.

At step 450, base station 105-*b* may transmit a different data block using resources based on feedback information carried on the ACK. For example, base station 105-*b* may transmit the data block (with redundancy versions) on multiple component carriers as described above with reference to FIG. 3.

Figure 5:
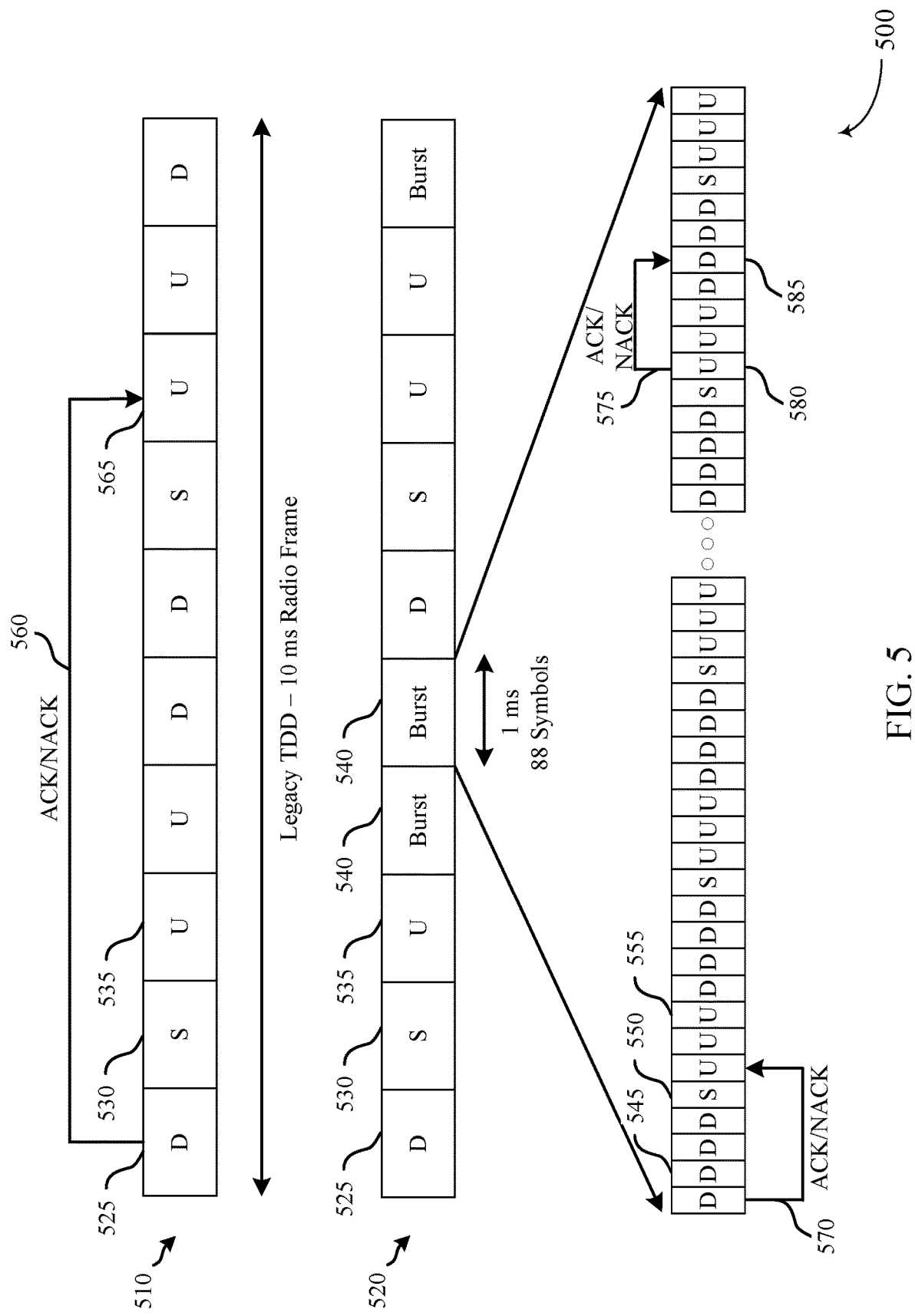
FIG. 5 illustrates an example of a low latency physical layer structure associated with fountain HARQ for reliable low latency communication in accordance with various aspects of the present disclosure.

FIG. 5 illustrates an example of a low latency physical layer structure 500 associated with fountain HARQ for reliable low latency communication in accordance with various aspects of the present disclosure. Low latency physical layer structure 500 may be used for communication between a UE 115 and a base station 105, or between multiple UE 115 as described above with reference to FIGS. 1-4. Low latency physical layer structure 500 may be used in conjunction with a fountain HARQ scheme as described above with reference to FIGS. 2-4. Low latency physical layer structure 500 illustrates one example of a low latency structure, but other structures may also be used in conjunction with a fountain HARQ scheme. For example, a low latency structure could incorporate band pairing, and ACKs could be provided on any symbol after the first transmission.

In some cases, a wireless communications system (e.g., wireless communications system 100 of FIG. 1) may have more than one hierarchical physical layer structure. For example, a second hierarchical layer may have lower latency compared to the first hierarchical layer. A radio frame 510 may include ten 1 ms subframes that include DL subframes 525, special subframes 530, and UL subframes 535, each of which may be used to transmit data symbols. A number of DL subframes 525 may be replaced with burst subframes 540 which may be transmitted according to a different hierarchical layer than DL subframes 525, special subframes 530, and UL subframes 535 (e.g., in the second layer). In some examples, burst subframes 540 may include a greater number of symbols than subframes in the first hierarchical layer (e.g., 88 symbols rather than 14 symbols), and may include DL symbols 545, special symbols 550, and UL symbols 555. In some cases, the symbols 545, 550, and 555 may have a reduced symbol duration relative to the symbols transmitted according to the first hierarchical layer. The reduced symbol duration may enable acknowledgment of transmissions with a reduced latency.

In first layer TDD frame 510, a UE 115 may receive a DL transmission in DL subframe 525 and transmit an acknowledgement (ACK) according to a first layer HARQ scheme in which ACKs are transmitted in a first available subframe at or after k+4 subframes following the receipt of a DL transmission. In some cases, subframe k+4 from DL subframe 525 may be another DL subframe, and an ACK/NACK 560 may be transmitted in following UL subframe 565. Thus, in this example, there is a 7 ms delay between DL subframe 525 and the ACK/NACK 560 associated with the subframe. In the event that a retransmission is appropriate (e.g., after receiving a NACK), the retransmission may be scheduled for a subsequent DL subframe. The retransmission timing may result in a relatively long round trip time (RTT) (e.g., a minimum of 11 ms). If an acknowledgment is sent in the fourth subframe following a DL transmission (in FDD mode ACK/NACK may be consistently transmitted in subframe k+4), the minimum RTT may be 8 ms.

Within burst subframes 540, the latency for providing ACKs may be less than the latency for transmissions in the first hierarchical layer. In some cases, transmissions using the second hierarchical layer may utilize similar HARQ techniques as with first layer transmissions. That is, ACKs may be provided in symbol k+4 (where k represents the original symbol transmission), or in a first available symbol for transmission afterward. For example, a UE 115 may receive a DL transmission in symbol 545 and provide an ACK/NACK 570 in UL symbol 555, which is five symbols after the receipt of DL transmission in DL symbol 545 (because the fourth symbol following the transmission is a special symbol 550). Thus, the UE 115 may provide ACK/NACK 570 of the DL transmission within the burst subframe 540, which is less than 1 ms following the receipt of the DL transmission in DL symbol 545. In some examples, similarly as discussed above with respect to FIG. 3A, the symbol duration for symbols in the burst subframe 540 may be 11.36 μs, resulting in an acknowledgment being provided in this example 56.8 μs following the DL symbol 545 transmission. The eNB may then schedule any required retransmission and thus may provide, in some examples, a resulting RTT of approximately 100 μs or less.

While ACK/NACK 570 is described with respect to a UE 115 receiving a DL symbol 545, similar functions may be performed for UL transmissions. For example, a UE may transmit an UL symbol 580 to an eNB, which may be acknowledged by the eNB through ACK/NACK 575 that is provided in DL symbol 585. In the event that a retransmission is necessary, such a retransmission may be provided in a subsequent UL symbol from the UE and thus may again provide, in some examples, a resulting RTT of approximately 100 μs or less. Accordingly, latency associated with transmissions in burst subframes 540 may be significantly reduced. Such reduced latency may enable enhanced data rates, through reduced RTTs which may reduce overall retransmission times.

Figure 6:
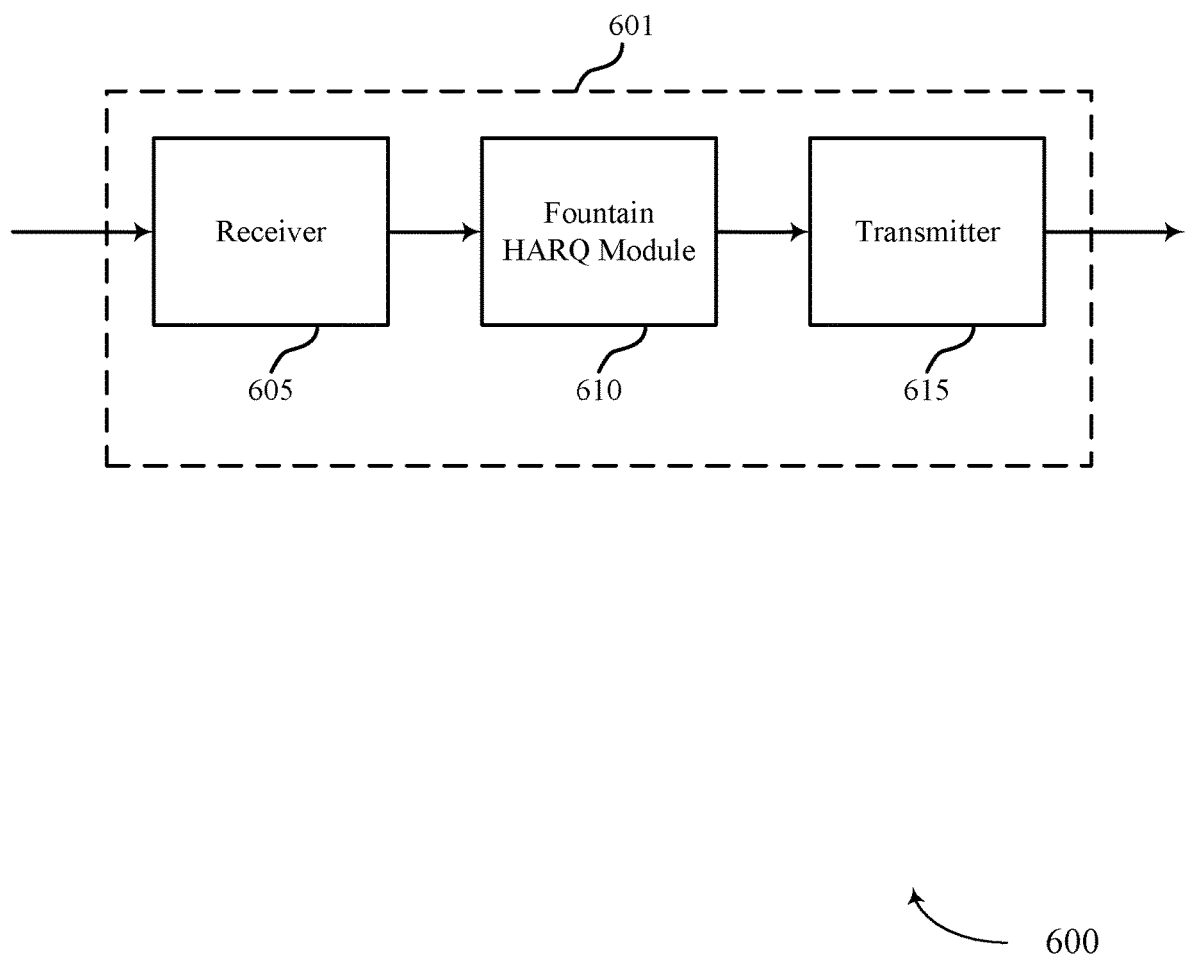
FIG. 6 shows a block diagram of a user equipment (UE) configured for fountain HARQ and reliable low latency communication in accordance with various aspects of the present disclosure.

FIG. 6 shows a block diagram 600 of a device 601 configured for fountain HARQ and reliable low latency communication in accordance with various aspects of the present disclosure. Device 601 may be an example of aspects of a UE 115 or a base station 105 described with reference to FIGS. 1-5. Device 601 may include a receiver 605, a fountain HARQ module 610, or a transmitter 615. Device 601 may also include a processor. Each of these components may be in communication with each other.

The components of device 601 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 605 may receive information such as packets, user data, or control information associated with various information channels (e.g., control channels, data channels, and information related to fountain HARQ for reliable low latency communication, etc.). Information may be passed on to the fountain HARQ module 610, and to other components of device 601.

The fountain HARQ module 610 may transmit a data block using a first set of resources based on a low latency operational mode, and transmit a number of redundancy versions of the data block using a second set of resources based on the low latency operational mode, the number of redundancy versions of the data block being transmitted prior to determining whether an ACK is received for the data block.

The transmitter 615 may transmit signals received from other components of device 601. In some embodiments, the transmitter 615 may be collocated with the receiver 605 in a transceiver module. The transmitter 615 may include a single antenna, or it may include a plurality of antennas.

Figure 7:
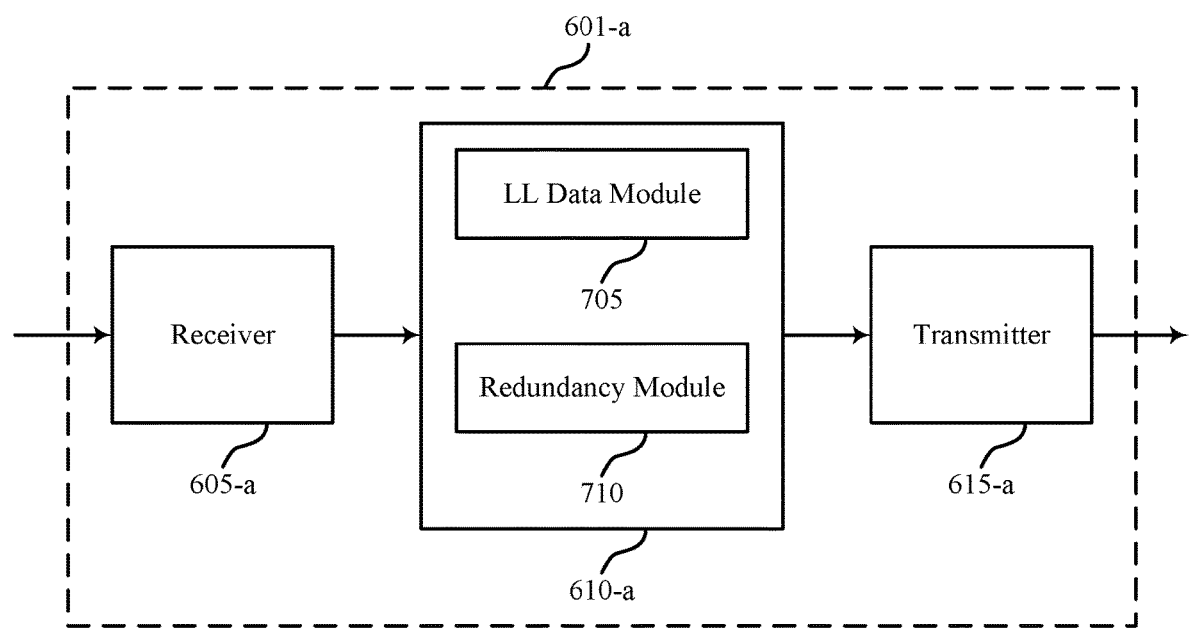
FIG. 7 shows a block diagram of a UE configured for fountain HARQ and reliable low latency communication in accordance with various aspects of the present disclosure.

FIG. 7 shows a block diagram 700 of a device 601-*a* configured for fountain HARQ and reliable low latency communication in accordance with various aspects of the present disclosure. Device 601-*a* may be an example of aspects of a UE 115 or base station 105 described with reference to FIGS. 1-6. Device 601-*a* may include a receiver 605-*a*, a fountain HARQ module 610-*a*, or a transmitter 615-*a*. Device 601-*a* may also include a processor. Each of these components may be in communication with each other. The fountain HARQ module 610-*a* may also include a low latency (LL) data module 705, and a redundancy module 710.

The components of device 601-*a* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 605-*a* may receive information which may be passed on to fountain HARQ module 610-*a*, and to other components of device 601-*a*. The fountain HARQ module 610-*a* may perform the operations described above with reference to FIG. 6. The transmitter 615-*a* may transmit signals received from other components of device 601-*a*.

The LL data module 705 may transmit a data block using a first set of resources based on a low latency operational mode as described above with reference to FIGS. 2-5. In some examples, the low latency operational mode comprises a reduced TTI time period. The LL data module 705 may also receive a data block using a first set of resources based on a low latency operational mode. In some examples, the low latency operational mode comprises a reduced TTI time period.

The redundancy module 710 may transmit a number of redundancy versions of the data block using a second set of resources based on the low latency operational mode, the number of redundancy versions of the data block being transmitted prior to determining whether an ACK is received for the data block as described above with reference to FIGS. 2-5. The redundancy module 710 may also refrain from transmitting an additional redundancy version of the data block based on the ACK. In some examples, the second set of resources may be contiguous to the first set of resources in time. In some examples, the redundancy module 710 may also receive a number of redundancy versions of the data block based on the low latency operational mode using the second set of resources prior to transmitting a NACK. In some examples, receiving the number of redundancy versions of the data block comprises receiving the number of redundancy versions of the data block over a plurality of symbols.

Figure 8:
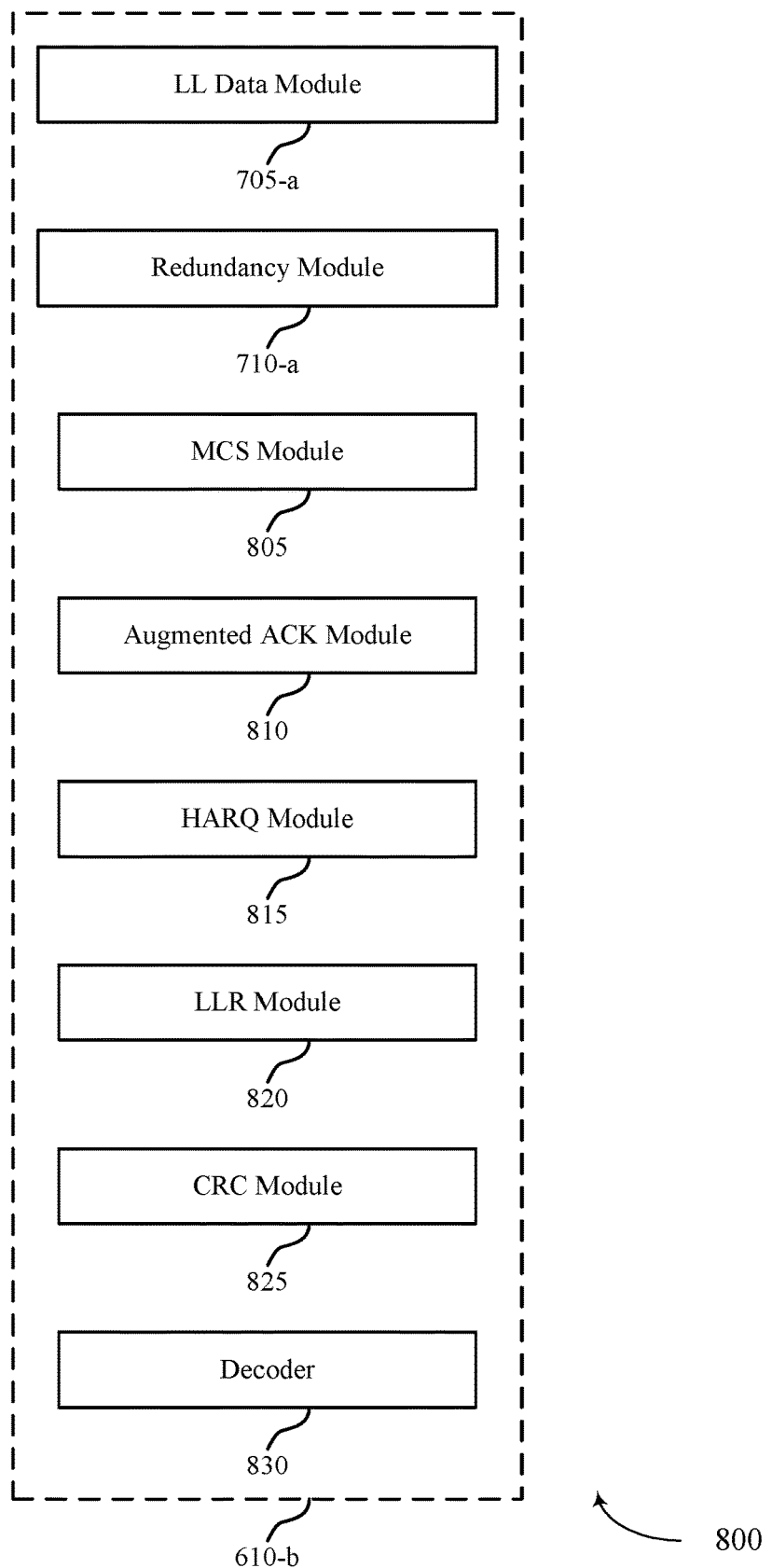
FIG. 8 shows a block diagram of a fountain HARQ module configured for fountain HARQ and reliable low latency communication in accordance with various aspects of the present disclosure.

FIG. 8 shows a block diagram 800 of a fountain HARQ module 610-*b* configured for fountain HARQ and reliable low latency communication in accordance with various aspects of the present disclosure. The fountain HARQ module 610-*b* may be an example of aspects of a fountain HARQ module 610 described with reference to FIGS. 6-7. The fountain HARQ module 610-*b* may include an LL data module 705-*a*, and a redundancy module 710-*a*. Each of these modules may perform the functions described above with reference to FIG. 7. The fountain HARQ module 610-*b* may also include an MCS module 805, an augmented ACK module 810, a HARQ module 815, an LLR module 820, a CRC module 825, and a decoder 830.

The components of the fountain HARQ module 610-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The MCS module 805 may select an initial MCS based at least in part on a channel condition or a size of the data block, wherein transmitting the data block is based on the initial MCS as described above with reference to FIGS. 2-5. The MCS module 805 may also select an updated MCS based at least in part on the augmented ACK. In some examples, receiving a data block comprises receiving the data block using the initial MCS based at least in part on a channel condition or a size of the data block. The MCS module 805 may also be configured to receive a subsequent data block using an updated MCS based at least in part on the augmented ACK.

The augmented ACK module 810 may generate an augmented ACK based at least in part on the number of redundancy versions (e.g., the number received prior to successfully decoding a data block). The augmented ACK may comprise an additional resource request as described above with reference to FIGS. 2-5. In some examples, the additional resource request may be based at least in part on one or more reliability metrics.

The HARQ module 815 may receive an ACK (e.g., on a reduced symbol duration UL control channel based on the low latency operational mode) as described above with reference to FIGS. 2-5. The HARQ module 815 may also receive a number of NACKs (corresponding to the number of redundancy versions) on the reduced symbol duration UL control channel. The HARQ module 815 may also transmit an ACK for a data block based on a determination that a set of LLRs passes the CRC. In some examples, the ACK may be transmitted on a reduced symbol duration UL control channel based on a low latency operational mode. The HARQ module 815 may also transmit a number of NACKs corresponding to the number of redundancy versions on the reduced symbol duration UL control channel.

The LLR module 820 may compute a first set of LLRs for the data block as described above with reference to FIGS. 2-5. The LLR module 820 may also compute an updated set of LLRs for the data block based on the number of redundancy versions received. The LLR module 820 may also determine that an accumulated quality metric for the updated set of LLRs exceeds a threshold (e.g., to determine whether to proceed with processing the bits).

The CRC module 825 may determine that a first set of decoded bits from the first set of LLRs does not pass a CRC as described above with reference to FIGS. 2-5. The CRC module 825 may also determine that a second set of decoded bits from the updated set of LLRs passes the CRC.

The decoder 830 may perform a decoding operation based on an initial or on an updated set of LLRs and, in some cases, based on the determination that an accumulated quality metric exceeds the threshold as described above with reference to FIGS. 2-5. In some examples, the decoding operation may be based in part on an intermediate set of LLRs or an intermediate set of decoded bits.

Figure 9:
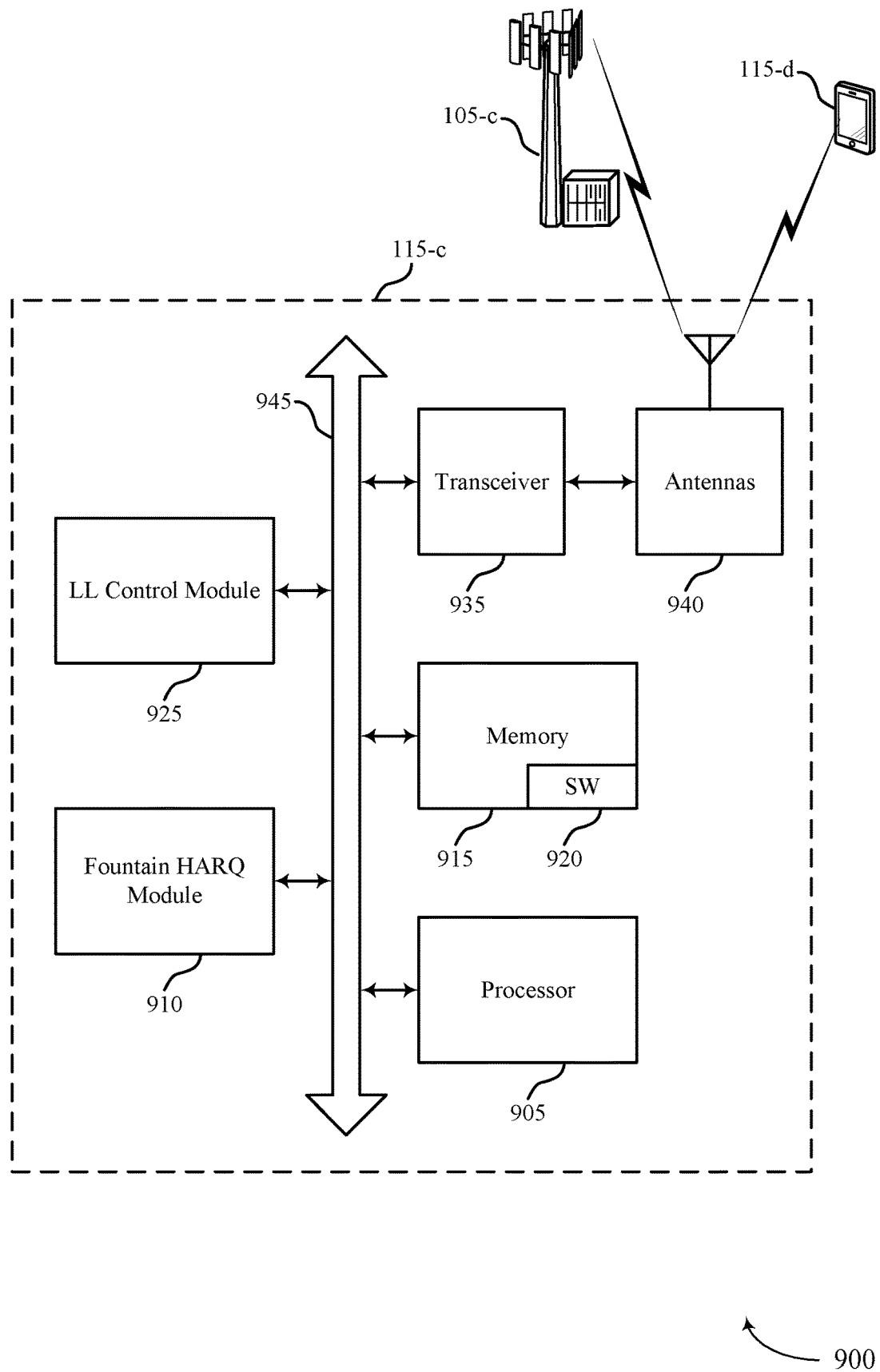
FIG. 9 illustrates a block diagram of a system including a UE configured for fountain HARQ and reliable low latency communication in accordance with various aspects of the present disclosure.

FIG. 9 shows a diagram of a system 900 including a UE 115 configured for fountain HARQ and reliable low latency communication in accordance with various aspects of the present disclosure. System 900 may include UE 115-c, which may be an example of a UE 115 described above with reference to FIGS. 1-8. UE 115-c may include a fountain HARQ module 910, which may be an example of a fountain HARQ module 610 described with reference to FIGS. 6-8. UE 115-c may also include a LL control module 925. UE 115-c may also include components for bi-directional voice and data communications including components for transmitting communications and components for receiving communications. For example, UE 115-c may communicate bi-directionally with UE 115-d or base station 105-c.

The LL control module 925 may be configured to transmit data or control information on a reduced symbol duration DL channel based on the low latency operational mode as described above with reference to FIGS. 2-5. The LL control module 925 may also receive data and control information on a reduced symbol duration DL channel based on the low latency operational mode. The low latency channels may be configured as described above with reference to FIG. 5.

UE 115-c may also include a processor module 905, and memory 915 (including software (SW)) 920, a transceiver module 935, and one or more antenna(s) 940, each of which may communicate, directly or indirectly, with each other (e.g., via buses 945). The transceiver module 935 may communicate bi-directionally, via the antenna(s) 940 or wired or wireless links, with one or more networks, as described above. For example, the transceiver module 935 may communicate bi-directionally with a base station 105 or another UE 115. The transceiver module 935 may include a modem to modulate the packets and provide the modulated packets to the antenna(s) 940 for transmission, and to demodulate packets received from the antenna(s) 940. While UE 115-c may include a single antenna 940, UE 115-c may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., fountain HARQ for reliable low latency communication, etc.). Alternatively, the software/firmware code 920 may not be directly executable by the processor module 905 but cause a computer (e.g., when compiled and executed) to perform functions described herein. The processor module 905 may include an intelligent hardware device, (e.g., a central processing unit (CPU), a microcontroller, an ASIC, etc.)

Figure 10:
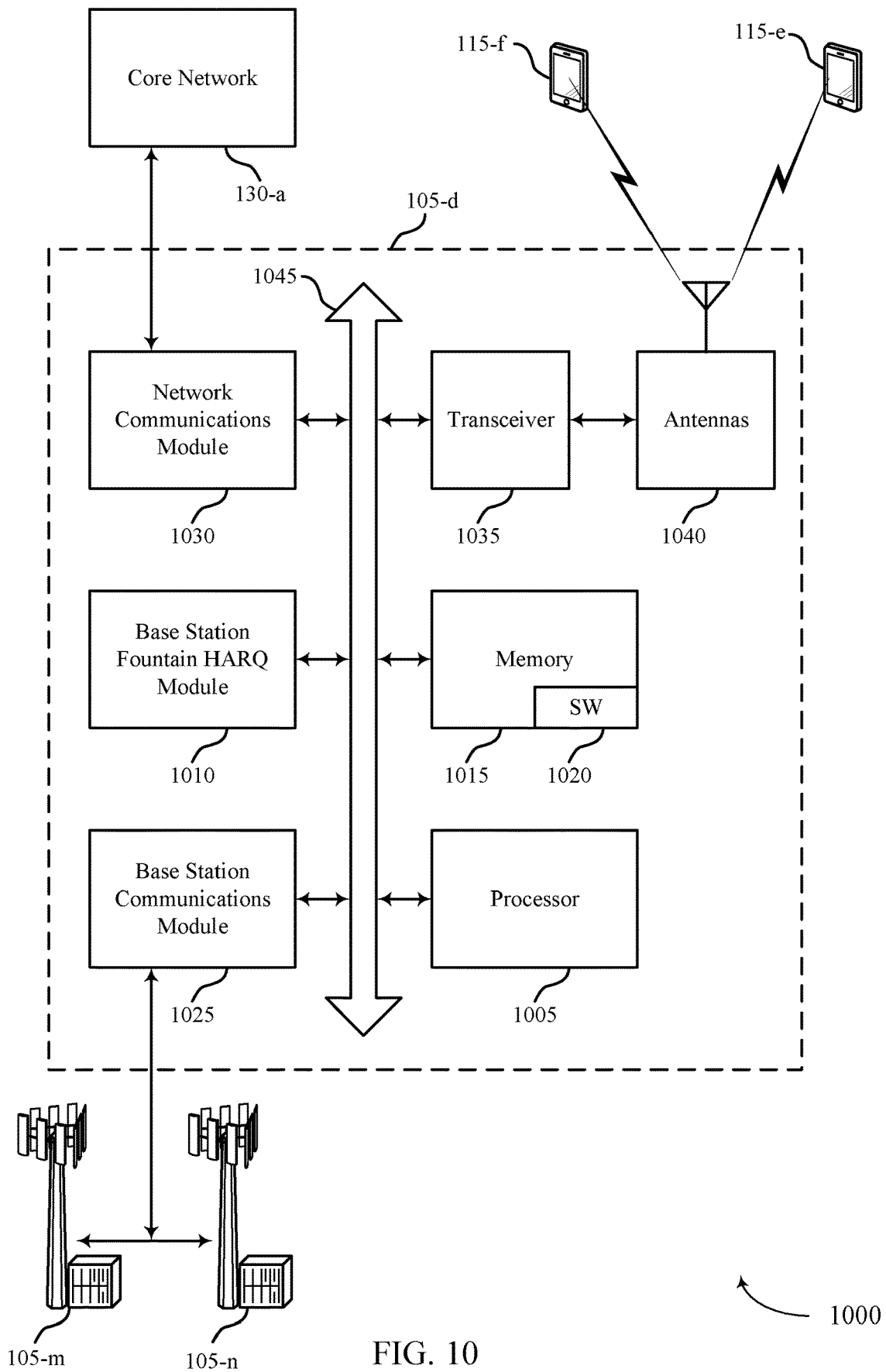
FIG. 10 illustrates a block diagram of a system including a base station configured for fountain HARQ and reliable low latency communication in accordance with various aspects of the present disclosure.

FIG. 10 shows a diagram of a system 1000 including a base station 105 configured for fountain HARQ and reliable low latency communication in accordance with various aspects of the present disclosure. System 1000 may include base station 105-d, which may be an example of a base station 105 described above with reference to FIGS. 1-9. Base station 105-d may include a base station fountain HARQ module 1010, which may be an example of a base station fountain HARQ module 1010 described with reference to FIGS. 7-9. Base station 105-d may also include components for bi-directional voice and data communications including components for transmitting communications and components for receiving communications. For example, base station 105-d may communicate bi-directionally with UE 115-e and UE 115-f.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-m and base station 105-n via inter-base station backhaul links (e.g., an X2 interface). Each of the base stations 105 may communicate with UEs 115 using the same or different wireless communications technologies. In some cases, base station 105-d may communicate with other base stations such as 105-m or 105-n utilizing base station communications module 1025. In some embodiments, base station communications module 1025 may provide an X2 interface within an LTE/LTE-A wireless communication network technology to provide communication between some of the base stations 105. In some embodiments, base station 105-d may communicate with other base stations through core network 130. In some cases, base station 105-d may communicate with the core network 130 through network communications module 1035.

The base station 105-d may include a processor module 1005, memory 1015 (including software (SW) 1020), transceiver modules 1030, and antenna(s) 1040, which each may be in communication, directly or indirectly, with each other (e.g., over bus system 1045). The transceiver modules 1030 may be configured to communicate bi-directionally, via the antenna(s) 1040, with the UEs 115, which may be multi-mode devices. The transceiver module 1030 (or other components of base station 105-d) may also be configured to communicate bi-directionally, via the antennas 1040, with one or more other base stations (not shown). The transceiver module 1030 may include a modem configured to modulate the packets and provide the modulated packets to the antennas 1040 for transmission, and to demodulate packets received from the antennas 1040. The base station 105-d may include multiple transceiver modules 1030, each with one or more associated antennas 1040. The transceiver module may be an example of a combined receiver 605 and transmitter 615 of FIG. 6.

The memory 1015 may include RAM and ROM. The memory 1015 may also store computer-readable, computer-executable software code 1020 containing instructions that are configured to, when executed, cause the processor module 1005 to perform various functions described herein (e.g., fountain HARQ for reliable low latency communication, selecting coverage enhancement techniques, call processing, database management, message routing, etc.). Alternatively, the software 1020 may not be directly executable by the processor module 1005 but be configured to cause the computer, e.g., when compiled and executed, to perform functions described herein. The processor module 1005 may include an intelligent hardware device, e.g., a CPU, a microcontroller, an ASIC, etc. The processor module 1005 may include various special purpose processors such as encoders, queue processing modules, base band processors, radio head controllers, digital signal processor (DSPs), and the like.

The base station communications module 1025 may manage communications with other base stations 105. The communications management module may include a controller or scheduler for controlling communications with UEs 115 in cooperation with other base stations 105. For example, the base station communications module 1025 may coordinate scheduling for transmissions to UEs 115 for various interference mitigation techniques such as beamforming or joint transmission.

Figure 11:
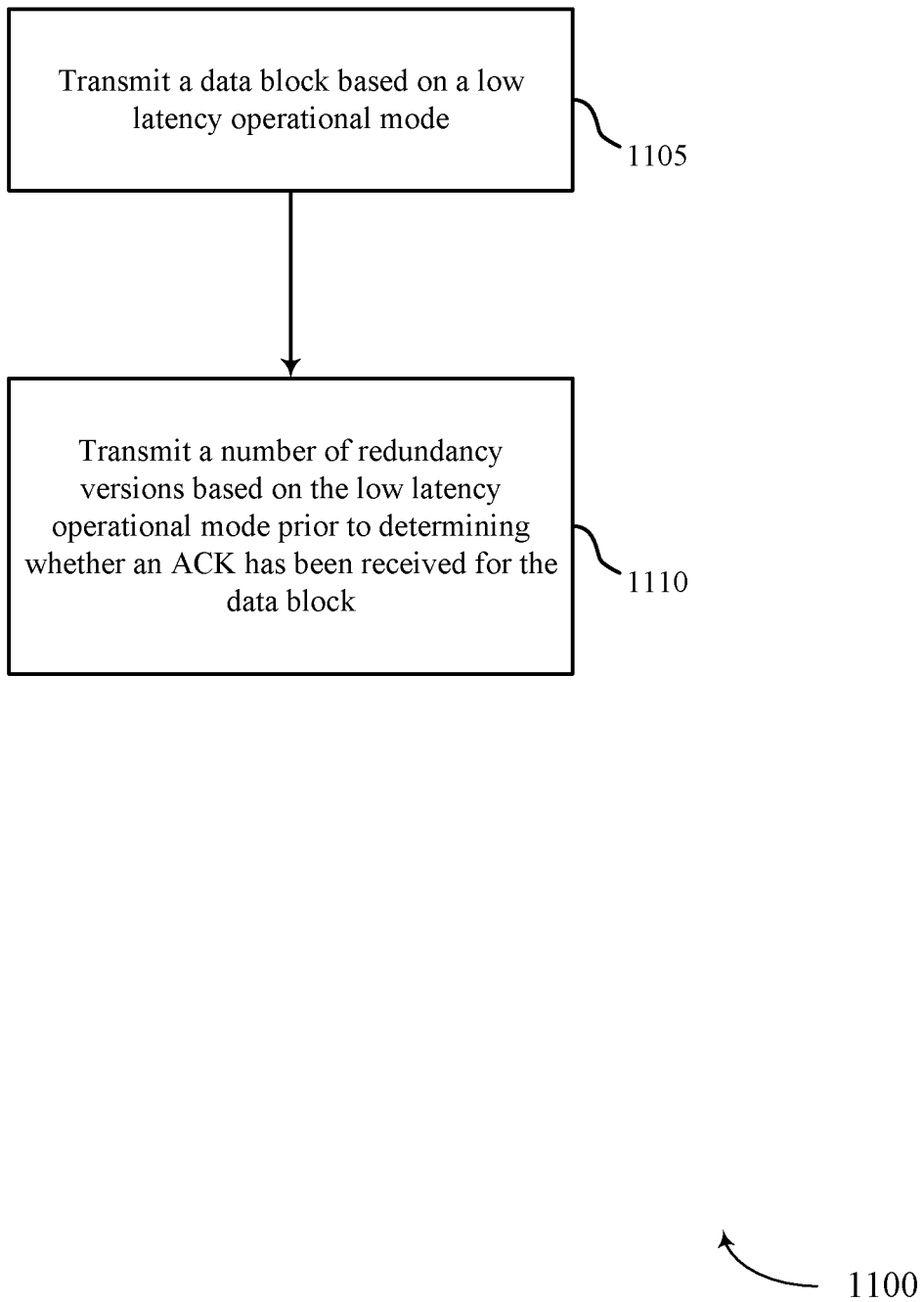
FIG. 11 shows a flowchart illustrating a method associated with fountain HARQ for reliable low latency communication in accordance with various aspects of the present disclosure.

FIG. 11 shows a flowchart illustrating a method 1100 associated with fountain HARQ for reliable low latency communication in accordance with various aspects of the present disclosure. The operations of method 1100 may be implemented by a wireless device which may be an example of a UE 115 or base station 105 or its components as described with reference to FIGS. 1-10. For example, the operations of method 1100 may be performed by the fountain HARQ module 610 as described with reference to FIGS. 6-10. In some examples, the device may execute a set of codes to control the functional elements of the device to perform the functions described below. Additionally or alternatively, the device may perform aspects of the functions described below using special-purpose hardware.

At block 1105, the device may transmit a data block using a first set of resources based on a low latency operational mode as described above with reference to FIGS. 2-5. In certain examples, the operations of block 1105 may be performed by the LL data module 705 as described above with reference to FIG. 7.

At block 1110, the device may transmit a number of redundancy versions of the data block using a second set of resources based on the low latency operational mode, the number of redundancy versions of the data block being transmitted prior to determining whether an ACK is received for the data block as described above with reference to FIGS. 2-5. In certain examples, the operations of block 1110 may be performed by the redundancy module 710 as described above with reference to FIG. 7.

Figure 12:
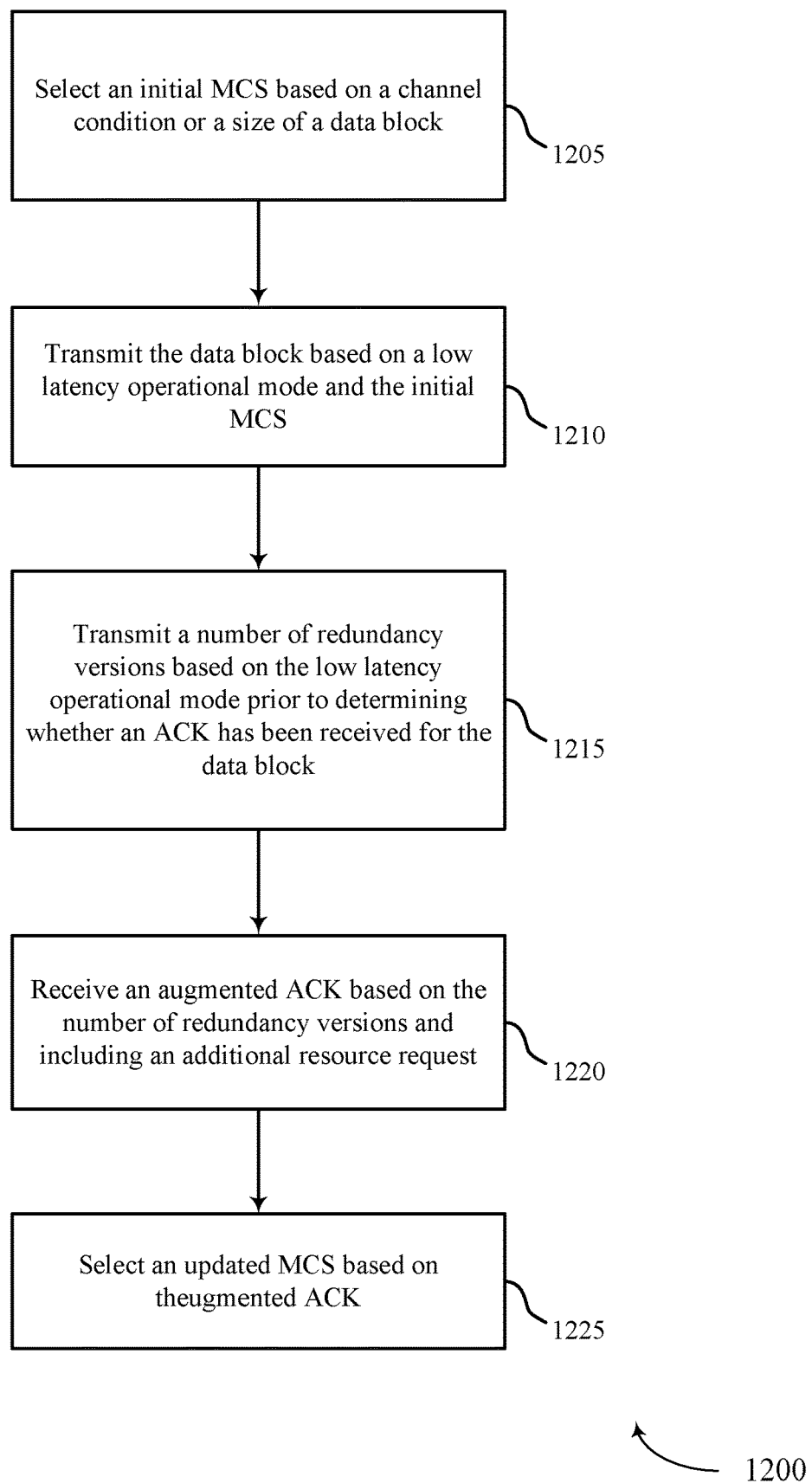
FIG. 12 shows a flowchart illustrating a method associated with fountain HARQ for reliable low latency communication in accordance with various aspects of the present disclosure.

FIG. 12 shows a flowchart illustrating a method 1200 associated with fountain HARQ for reliable low latency communication in accordance with various aspects of the present disclosure. The operations of method 1200 may be implemented by a wireless device which may be an example of a UE 115 or base station 105 or its components as described with reference to FIGS. 1-10. For example, the operations of method 1200 may be performed by the fountain HARQ module 610 as described with reference to FIGS. 6-10. In some examples, a device may execute a set of codes to control the functional elements of the device to perform the functions described below. Additionally or alternatively, the device may perform aspects of the functions described below using special-purpose hardware. The method 1200 may also incorporate aspects of method 1100 of FIG. 11.

At block 1205, the device may select an initial MCS based at least in part on a channel condition or a size of a data block, wherein transmitting the data block is based on the initial MCS as described above with reference to FIGS. 2-5. In certain examples, the operations of block 1205 may be performed by the MCS module 805 as described above with reference to FIG. 8.

At block 1210, the device may transmit the data block using a first set of resources based on a low latency operational mode as described above with reference to FIGS. 2-5. In certain examples, the operations of block 1210 may be performed by the LL data module 705 as described above with reference to FIG. 7.

At block 1215, the device may transmit a number of redundancy versions of the data block using a second set of resources based on the low latency operational mode, the number of redundancy versions of the data block being transmitted prior to determining whether an ACK is received for the data block as described above with reference to FIGS. 2-5. In certain examples, the operations of block 1215 may be performed by the redundancy module 710 as described above with reference to FIG. 7.

At block 1220, the device may receive an ACK. In some cases, the ACK is an augmented ACK based at least in part on the number of redundancy versions and comprising an additional resource request as described above with reference to FIGS. 2-5. In certain examples, the operations of block 1220 may be performed by the augmented ACK module 810 as described above with reference to FIG. 8.

At block 1225, the device may select an updated MCS based at least in part on the augmented ACK as described above with reference to FIGS. 2-5. In certain examples, the operations of block 1225 may be performed by the MCS module 805 as described above with reference to FIG. 8.

Figure 13:
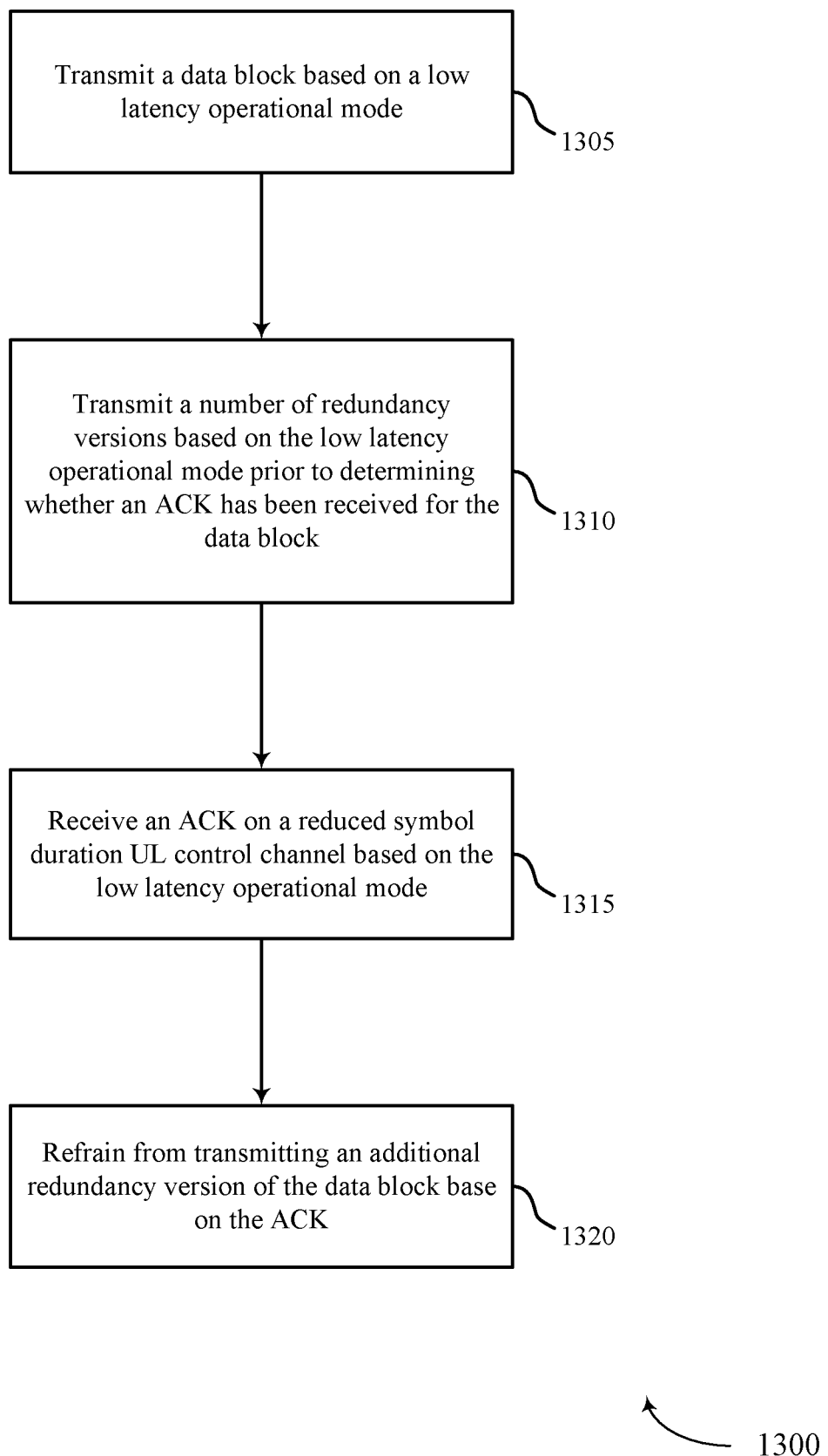
FIG. 13 shows a flowchart illustrating a method associated with fountain HARQ for reliable low latency communication in accordance with various aspects of the present disclosure.

FIG. 13 shows a flowchart illustrating a method 1300 associated with fountain HARQ for reliable low latency communication in accordance with various aspects of the present disclosure. The operations of method 1300 may be implemented by a wireless device which may be an example of a UE 115 or base station 105 or its components as described with reference to FIGS. 1-10. For example, the operations of method 1300 may be performed by the fountain HARQ module 610 as described with reference to FIGS. 6-10. In some examples, a device may execute a set of codes to control the functional elements of the device to perform the functions described below. Additionally or alternatively, the device may perform aspects of the functions described below using special-purpose hardware. The method 1300 may also incorporate aspects of methods 1100, and 1200 of FIGS. 11-12.

At block 1305, the device may transmit a data block using a first set of resources based on a low latency operational mode as described above with reference to FIGS. 2-5. In certain examples, the operations of block 1305 may be performed by the LL data module 705 as described above with reference to FIG. 7.

At block 1310, the device may transmit a number of redundancy versions of the data block using a second set of resources based on the low latency operational mode, the number of redundancy versions of the data block being transmitted prior to determining whether an ACK is received for the data block as described above with reference to FIGS. 2-5. In certain examples, the operations of block 1310 may be performed by the redundancy module 710 as described above with reference to FIG. 7.

At block 1315, the device may receive the ACK on a reduced symbol duration UL control channel based on the low latency operational mode as described above with reference to FIGS. 2-5. In certain examples, the operations of block 1315 may be performed by the HARQ module 815 as described above with reference to FIG. 8.

At block 1320, the device may refrain from transmitting an additional redundancy version of the data block based on the ACK as described above with reference to FIGS. 2-5. In certain examples, the operations of block 1320 may be performed by the redundancy module 710 as described above with reference to FIG. 7.

Figure 14:
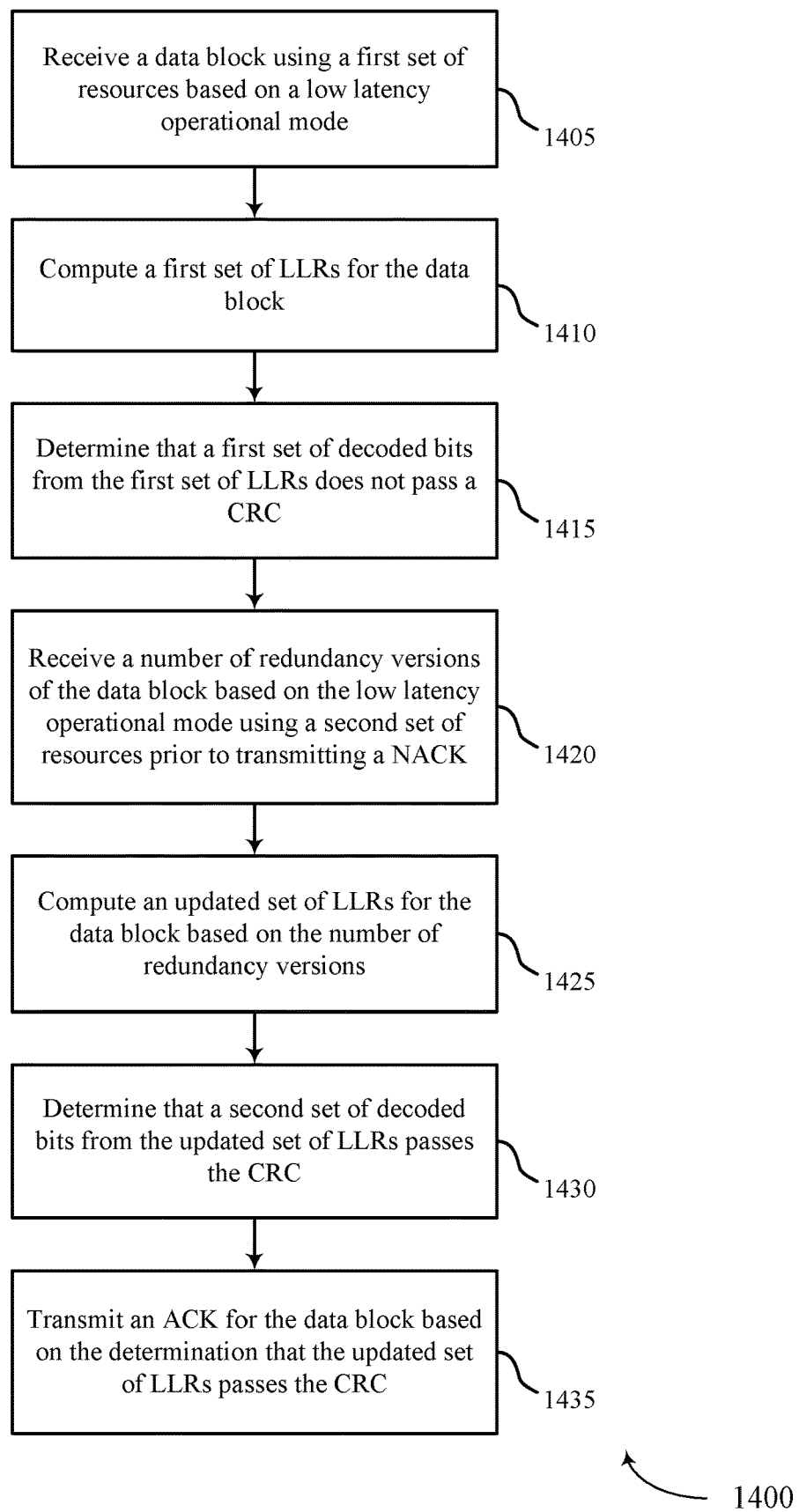
FIG. 14 shows a flowchart illustrating a method associated with fountain HARQ for reliable low latency communication in accordance with various aspects of the present disclosure.

FIG. 14 shows a flowchart illustrating a method 1400 associated with fountain HARQ for reliable low latency communication in accordance with various aspects of the present disclosure. The operations of method 1400 may be implemented by a wireless device which may be an example of a UE 115 or base station 105 or its components as described with reference to FIGS. 1-10. For example, the operations of method 1400 may be performed by the fountain HARQ module 610 as described with reference to FIGS. 6-10. In some examples, a device may execute a set of codes to control the functional elements of the device to perform the functions described below. Additionally or alternatively, the device may perform aspects of the functions described below using special-purpose hardware. The method 1400 may also incorporate aspects of methods 1100, 1200, and 1300 of FIGS. 11-13.

At block 1405, the device may receive a data block using a first set of resources based on a low latency operational mode as described above with reference to FIGS. 2-5. In certain examples, the operations of block 1405 may be performed by the LL data module 705 as described above with reference to FIG. 7.

At block 1410, the device may compute a first set of LLRs for the data block as described above with reference to FIGS. 2-5. In certain examples, the operations of block 1410 may be performed by the LLR module 820 as described above with reference to FIG. 8.

At block 1415, the device may determine that a first set of decoded bits from the first set of LLRs does not pass a CRC as described above with reference to FIGS. 2-5. In certain examples, the operations of block 1415 may be performed by the CRC module 825 as described above with reference to FIG. 8.

At block 1420, the device may receive a number of redundancy versions of the data block based on the low latency operational mode using a second set of resources prior to transmitting a NACK as described above with reference to FIGS. 2-5. In certain examples, the operations of block 1420 may be performed by the redundancy module 710 as described above with reference to FIG. 7.

At block 1425, the device may compute an updated set of LLRs for the data block based on the number of redundancy versions as described above with reference to FIGS. 2-5. In certain examples, the operations of block 1425 may be performed by the LLR module 820 as described above with reference to FIG. 8.

At block 1430, the device may determine that a second set of decoded bits from the updated set of LLRs passes the CRC as described above with reference to FIGS. 2-5. In certain examples, the operations of block 1430 may be performed by the CRC module 825 as described above with reference to FIG. 8.

At block 1435, the device may transmit an ACK for the data block based on the determination that the updated set of LLRs passes the CRC as described above with reference to FIGS. 2-5. In certain examples, the operations of block 1435 may be performed by the HARQ module 815 as described above with reference to FIG. 8.

Figure 15:
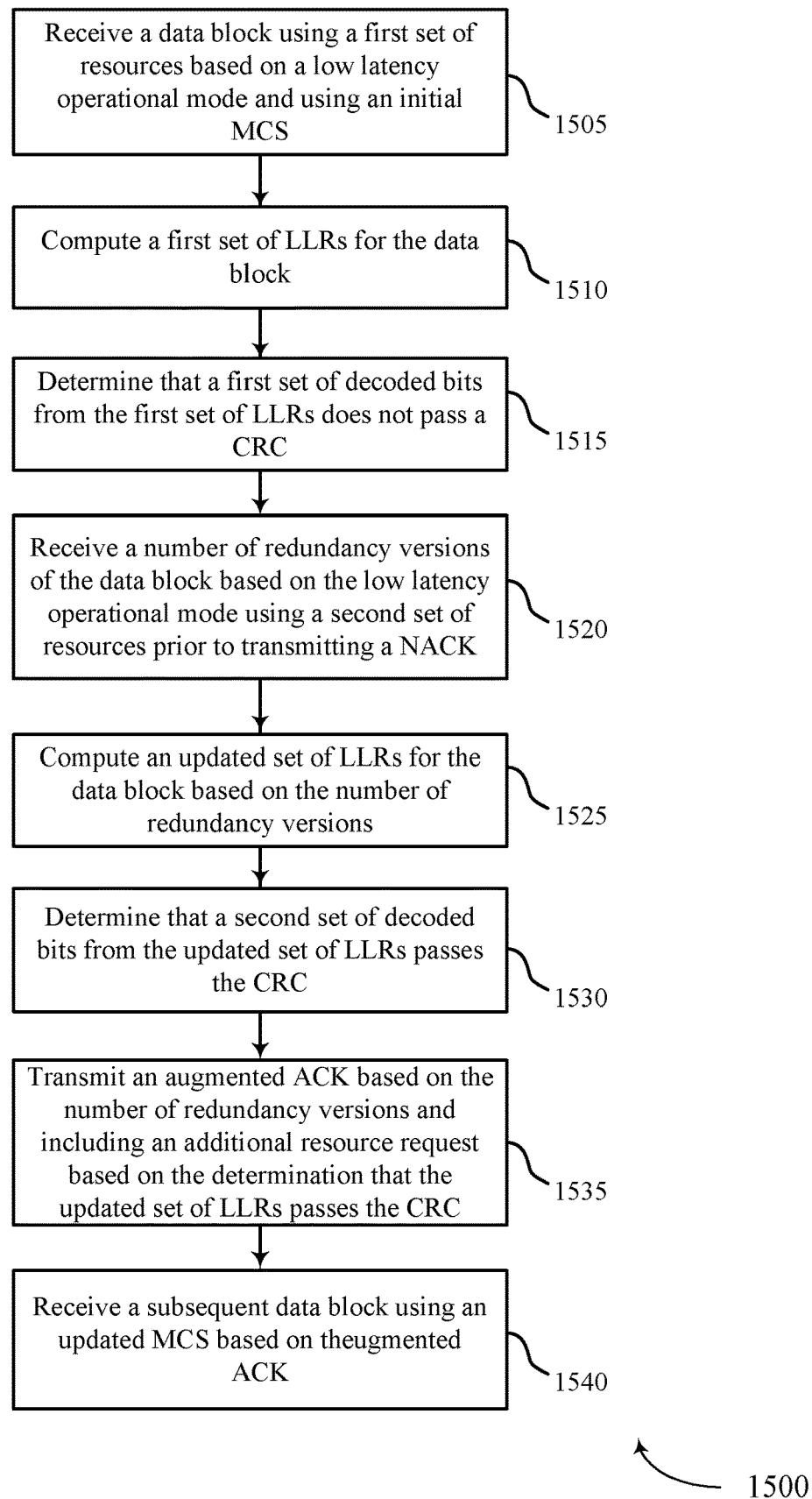
FIG. 15 shows a flowchart illustrating a method associated with fountain HARQ for reliable low latency communication in accordance with various aspects of the present disclosure.

FIG. 15 shows a flowchart illustrating a method 1500 associated with fountain HARQ for reliable low latency communication in accordance with various aspects of the present disclosure. The operations of method 1500 may be implemented by a wireless device which may be an example of a UE 115 or base station 105 or its components as described with reference to FIGS. 1-10. For example, the operations of method 1500 may be performed by the fountain HARQ module 610 as described with reference to FIGS. 6-10. In some examples, a device may execute a set of codes to control the functional elements of the device to perform the functions described below. Additionally or alternatively, the device may perform aspects of the functions described below using special-purpose hardware. The method 1500 may also incorporate aspects of methods 1100, 1200, 1300, and 1400 of FIGS. 11-14.

At block 1505, the device may receive a data block using a first set of resources based on a low latency operational mode as described above with reference to FIGS. 2-5. In certain examples, the operations of block 1505 may be performed by the LL data module 705 as described above with reference to FIG. 7.

At block 1510, the device may compute a first set of LLRs for the data block as described above with reference to FIGS. 2-5. In certain examples, the operations of block 1510 may be performed by the LLR module 820 as described above with reference to FIG. 8.

At block 1515, the device may determine that a first set of decoded bits from the first set of LLRs does not pass a CRC as described above with reference to FIGS. 2-5. In certain examples, the operations of block 1515 may be performed by the CRC module 825 as described above with reference to FIG. 8.

At block 1520, the device may receive a number of redundancy versions of the data block based on the low latency operational mode using a second set of resources prior to transmitting a NACK as described above with reference to FIGS. 2-5. In certain examples, the operations of block 1520 may be performed by the redundancy module 710 as described above with reference to FIG. 7.

At block 1525, the device may compute an updated set of LLRs for the data block based on the number of redundancy versions as described above with reference to FIGS. 2-5. In certain examples, the operations of block 1525 may be performed by the LLR module 820 as described above with reference to FIG. 8.

At block 1530, the device may determine that a second set of decoded bits from the updated set of LLRs passes the CRC as described above with reference to FIGS. 2-5. In certain examples, the operations of block 1530 may be performed by the CRC module 825 as described above with reference to FIG. 8.

At block 1535, the device may transmit an ACK for the data block based on the determination that the updated set of LLRs passes the CRC as described above with reference to FIGS. 2-5. The ACK may be an augmented ACK based at least in part on the number of redundancy versions and comprising an additional resource request. In certain examples, the operations of block 1535 may be performed by the HARQ module 815 as described above with reference to FIG. 8.

At block 1540, the device may receive a subsequent data block using an updated MCS based at least in part on the augmented ACK as described above with reference to FIGS. 2-5. In certain examples, the operations of block 1540 may be performed by the MCS module 805 as described above with reference to FIG. 8.

Figure 16:
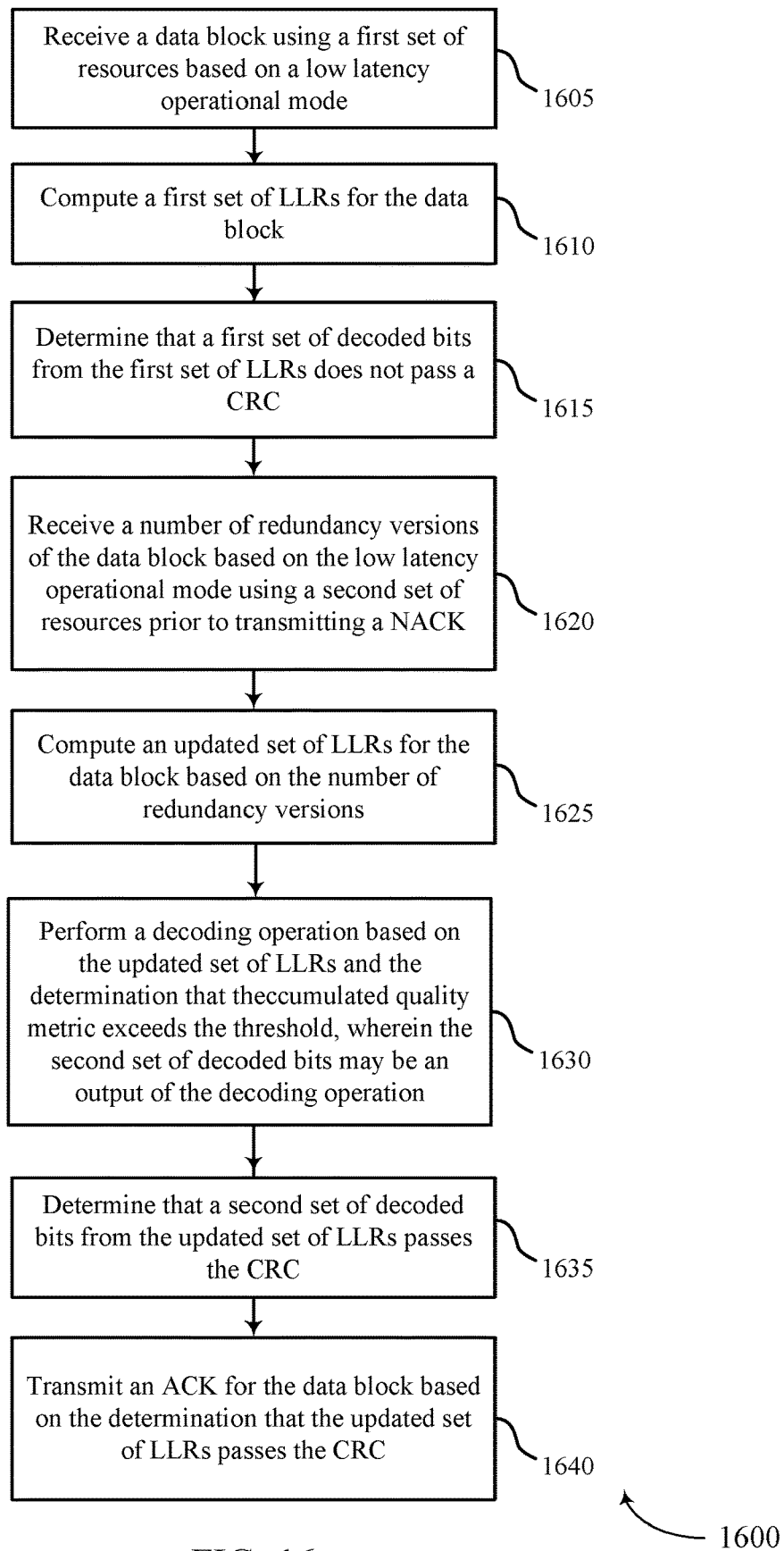
FIG. 16 shows a flowchart illustrating a method associated with fountain HARQ for reliable low latency communication in accordance with various aspects of the present disclosure.

FIG. 16 shows a flowchart illustrating a method 1600 associated with fountain HARQ for reliable low latency communication in accordance with various aspects of the present disclosure. The operations of method 1600 may be implemented by a wireless device which may be an example of a UE 115 or base station 105 or its components as described with reference to FIGS. 1-10. For example, the operations of method 1600 may be performed by the fountain HARQ module 610 as described with reference to FIGS. 6-10. In some examples, a device may execute a set of codes to control the functional elements of the device to perform the functions described below. Additionally or alternatively, the device may perform aspects of the functions described below using special-purpose hardware. The method 1600 may also incorporate aspects of methods 1100, 1200, 1300, 1400, and 1500 of FIGS. 11-15.

At block 1605, the device may receive a data block using a first set of resources based on a low latency operational mode as described above with reference to FIGS. 2-5. In certain examples, the operations of block 1605 may be performed by the LL data module 705 as described above with reference to FIG. 7.

At block 1610, the device may compute a first set of LLRs for the data block as described above with reference to FIGS. 2-5. In certain examples, the operations of block 1610 may be performed by the LLR module 820 as described above with reference to FIG. 8.

At block 1615, the device may determine that a first set of decoded bits from the first set of LLRs does not pass a CRC as described above with reference to FIGS. 2-5. In certain examples, the operations of block 1615 may be performed by the CRC module 825 as described above with reference to FIG. 8.

At block 1620, the device may receive a number of redundancy versions of the data block based on the low latency operational mode using a second set of resources prior to transmitting a NACK as described above with reference to FIGS. 2-5. In certain examples, the operations of block 1620 may be performed by the redundancy module 710 as described above with reference to FIG. 7.

At block 1625, the device may compute an updated set of LLRs for the data block based on the number of redundancy versions as described above with reference to FIGS. 2-5. In certain examples, the operations of block 1625 may be performed by the LLR module 820 as described above with reference to FIG. 8.

At block 1630, the device may perform a decoding operation based on the updated set of LLRs and the determination that the accumulated quality metric exceeds the threshold, wherein the second set of decoded bits is an output of the decoding operation as described above with reference to FIGS. 2-5. In certain examples, the operations of block 1630 may be performed by the decoder 830 as described above with reference to FIG. 8.

At block 1635, the device may determine that a second set of decoded bits from the updated set of LLRs passes the CRC as described above with reference to FIGS. 2-5. In certain examples, the operations of block 1635 may be performed by the CRC module 825 as described above with reference to FIG. 8.

At block 1640, the device may transmit an ACK for the data block based on the determination that the updated set of LLRs passes the CRC as described above with reference to FIGS. 2-5. In certain examples, the operations of block 1640 may be performed by the HARQ module 815 as described above with reference to FIG. 8.

Thus, methods 1100, 1200, 1300, 1400, 1500, and 1600 may provide for wireless communications associated with fountain HARQ for reliable low latency communication. It should be noted that methods 1100, 1200, 1300, 1400, 1500, and 1600 describe possible implementation, and that the operations and the steps may be rearranged or otherwise modified such that other implementations are possible. In some examples, aspects from two or more of the methods 1100, 1200, 1300, 1400, 1500, and 1600 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication comprising:
   transmitting a data block;
   transmitting a redundancy version or versions of the data block;
   receiving a transmission, the transmission comprising a request for bandwidth; and
   responsive to the transmission,
   ceasing the transmitting the redundancy version or versions of the data block.

2. The method of claim 1,
   further comprising:
   responsive to the transmission, transmitting a second transmission on a bandwidth based on the request for bandwidth.

3. The method of claim 2, the second transmission comprising a second redundant version or versions of the data block.

4. A method of wireless communication comprising:
   receiving a data block using a first set of resources based at least in part on a low latency operational mode;
   computing a first set of log-likelihood ratios (LLRs) for the data block;
   determining that a first set of decoded bits from the first set of LLRs does not pass a cyclic redundancy check (CRC);
   receiving a redundancy version of the data block based at least in part on the low latency operational mode using a second set of resources prior to transmitting a negative acknowledgement (NACK);
   computing an updated set of LLRs for the data block based at least in part on the redundancy version;
   determining that a second set of decoded bits from the updated set of LLRs passes the CRC; and
   transmitting an acknowledgement (ACK) for the data block based at least in part on determining that the updated set of LLRs passes the CRC.

5. The method of claim 4, wherein receiving the data block comprises:
   receiving the data block using an initial modulation and coding scheme (MCS) based at least in part on a channel condition or a size of the data block.

6. The method of claim 5, further comprising:
receiving a transmission using a transmission scheme adjusted based at least in part on feedback information, wherein the adjusted transmission scheme is an updated MCS.

7. The method of claim 6, wherein the feedback information comprises an additional resource request that is based at least in part on one or more reliability metrics.

8. The method of claim 6, wherein the feedback information is transmitted on a reduced symbol duration uplink (UL) control channel based at least in part on the low latency operational mode.

9. The method of claim 8, further comprising:
transmitting a plurality of NACKs corresponding to a plurality of redundancy versions on the reduced symbol duration UL control channel.

10. The method of claim 4, further comprising:
receiving control information on a reduced symbol duration downlink (DL) control channel based at least in part on the low latency operational mode.

11. The method of claim 4, wherein the low latency operational mode comprises a reduced transmission time interval (TTI) time period.

12. The method of claim 4, wherein the second set of resources is contiguous to the first set of resources in time.

13. The method of claim 4, wherein receiving the redundancy version of the data block comprises:
receiving a plurality of redundancy versions of the data block over a plurality of symbols.

14. The method of claim 4, further comprising:
determining that an accumulated quality metric for the updated set of LLRs exceeds a threshold.

15. The method of claim 4, further comprising:
performing a decoding operation based at least in part on the updated set of LLRs and determining that an accumulated quality metric exceeds a threshold, wherein the second set of decoded bits is an output of the decoding operation.

16. The method of claim 15, wherein the decoding operation is based in part on an intermediate set of LLRs or an intermediate set of decoded bits.

17. An apparatus for wireless communication comprising:
a memory;
a processor coupled to the memory and configured to:
transmit a data block;
transmit a redundancy version or versions of the data block;
receive a transmission, the transmission comprising a request for bandwidth; and
responsive to the transmission,
cease the transmitting the redundancy version or versions of the data block.

18. The apparatus of claims 17, the processor being further configured to:
responsive to the transmission, transmit a second transmission on a bandwidth based on the request for bandwidth.

19. The apparatus of claim 18, the second transmission comprising a second redundant version or versions of the data block.

20. An apparatus for wireless communication comprising:
a processor;
memory in electronic communication with the processor; and
instructions stored in the memory; wherein the instructions are executable by the processor to: receive a data block using a first set of resources based at least in part on a low latency operational mode;
compute a first set of log-likelihood ratios (LLRs) for the data block;
determine that a first set of decoded bits from the first set of LLRs does not pass a cyclic redundancy check (CRC);
receive a redundancy version of the data block based at least in part on the low latency operational mode using a second set of resources prior to transmitting a negative acknowledgement (NACK);
compute an updated set of LLRs for the data block based at least in part on the redundancy version;
determine that a second set of decoded bits from the updated set of LLRs passes the CRC; and
transmit an acknowledgement (ACK) for the data block based at least in part on determining that the updated set of LLRs passes the CRC.

21. The apparatus of claim 20, wherein the instructions to receive the data block are further executable by the processor to:
receive the data block using an initial modulation and coding scheme (MCS) based at least in part on a channel condition or a size of the data block.

22. The apparatus of claim 21, wherein the instructions are executable by the processor to:
receive a transmission using a transmission scheme adjusted based at least in part on feedback information, wherein the adjusted transmission scheme is an updated MCS.

23. The apparatus of claim 22, wherein the feedback information comprises an additional resource request that is based at least in part on one or more reliability metrics.

24. A method of wireless communication comprising:
receiving a data block;
receiving a redundancy version or versions of the data block;
transmitting a transmission, the transmission comprising a request for bandwidth; and
responsive to transmitting the transmission,
ceasing the receiving the redundancy version or versions of the data block.

25. The method of claim 24,
further comprising:
responsive to transmitting the transmission, receiving a second transmission on a bandwidth based on the request for bandwidth.

26. The method of claim 25, the second transmission comprising a second redundant version or versions of the data block.

* * * * *